United States Patent [19]

deGroot et al.

[11] Patent Number: 5,773,106

[45] Date of Patent: Jun. 30, 1998

[54] POLYOLEFIN COMPOSITIONS EXHIBITING HEAT RESISTIVITY, LOW HEXANE-EXTRACTIVES AND CONTROLLED MODULUS

[75] Inventors: Jacquelyn A. deGroot; Pradeep Jain; Lonnie G. Hazlitt, all of Lake Jackson; Seema V. Karande, Missouri City; Laura K. Mergenhagen, Lake Jackson; Dan G. Moldovan, Danbury; Kenneth B. Stewart; Nicole F. Whiteman, both of Lake Jackson, all of Tex.

[73] Assignee: The Dow Chemical Company, Midland, Mich.

[21] Appl. No.: 487,819

[22] Filed: Jun. 7, 1995

Related U.S. Application Data

[62] Division of Ser. No. 327,156, Oct. 21, 1994, abandoned.

[51] Int. Cl.⁶ .......................... B29D 31/00; C08L 23/08; C08L 23/16
[52] U.S. Cl. .......................................... 428/35.7; 525/240
[58] Field of Search ............................ 525/240; 428/35.7

[56] References Cited

U.S. PATENT DOCUMENTS

| | | |
|---|---|---|
| Re. 33,683 | 9/1991 | Allen et al. . |
| 2,983,704 | 5/1961 | Roedel . |
| 3,014,702 | 12/1961 | Oldershaw et al. . |
| 3,231,636 | 1/1966 | Snyder et al. . |
| 3,239,197 | 3/1966 | Tollar . |
| 3,247,290 | 4/1966 | Werkman et al. . |
| 3,340,328 | 9/1967 | Brindell et al. . |
| 3,371,464 | 3/1968 | Swick . |
| 3,456,044 | 7/1969 | Pahlke . |
| 3,491,073 | 1/1970 | Marinak . |
| 3,555,604 | 1/1971 | Pahlke . |
| 3,645,992 | 2/1972 | Elston . |
| 3,914,342 | 10/1975 | Mitchell . |
| 3,974,241 | 8/1976 | Lundberg . |
| 3,998,914 | 12/1976 | Lillis et al. .............................. 260/897 |
| 4,011,384 | 3/1977 | Baxmann et al. . |
| 4,048,428 | 9/1977 | Baird, Jr. et al. . |
| 4,076,698 | 2/1978 | Anderson et al. . |
| 4,188,443 | 2/1980 | Mueller et al. . |
| 4,194,039 | 3/1980 | Mueller . |
| 4,205,021 | 5/1980 | Morita et al. . |
| 4,229,241 | 10/1980 | Mueller . |
| 4,230,831 | 10/1980 | Sakurai et al. . |
| 4,243,619 | 1/1981 | Fraser et al. . |
| 4,259,468 | 3/1981 | Kajiura et al. . |
| 4,302,566 | 11/1981 | Karol et al. . |
| 4,303,710 | 12/1981 | Bullard et al. . |
| 4,303,771 | 12/1981 | Wagner et al. . |
| 4,314,912 | 2/1982 | Lowery, Jr. et al. . |
| 4,320,088 | 3/1982 | Nicco . |
| 4,328,328 | 5/1982 | Minami et al. . |
| 4,330,639 | 5/1982 | Matsuura et al. . |
| 4,330,646 | 5/1982 | Sakurai et al. . |
| 4,339,493 | 7/1982 | Weiner . |
| 4,339,496 | 7/1982 | Weiner . |

(List continued on next page.)

FOREIGN PATENT DOCUMENTS

| | | |
|---|---|---|
| 684471 | 4/1964 | Canada . |
| 1260490 | 9/1989 | Canada . |
| 2008315 | 7/1990 | Canada .............................. C08F 4/16 |
| 0129368 | 12/1984 | European Pat. Off. . |
| 141597A1 | 5/1985 | European Pat. Off. . |
| 0243965A2 | 4/1987 | European Pat. Off. . |
| 236099A2 | 9/1987 | European Pat. Off. . |

(List continued on next page.)

OTHER PUBLICATIONS

*Modern Methods of Polymer Characterization*, pp. 103–112, (1991) "Measurement of Long–Chain Branch Frequency in Synthetic Polymers", by Alfred Rudin.

*The Journal of Chemical Physics*, vol. 17, No. 12, Dec. (1949), pp. 1301–1314, "The Dimensions of Chain Molecules Containing Branches and Rings"i, by Bruno H. Zimm and Walter H. Stockmayer.

*Antec 93—Be In That Number*, New Orleans, May 9–13, (1993), vol. II, "Dow Constrained Geometry Catalyst Technology (CGCT): New Rules For Ethylene a–Olefins Interpolymers–Controlled Rheology Polyolefins", pp. 1188–1192, by S. Lai and G. W. Knight.

*Journal of Rheology*, (1986), pp. 340–341, 344–345, 348–349, 352–353, 356–357, "Wall Slip in Viscous Fluids and Influence of Materials of Construction", by A. V. Ramamurthy.

*Rheometers for Molten Plastics*, (1982), pp. 97–99, by John Dealy.

*Polymer Engineering and Science*, vol. 17, No. 11, Nov. (1977), pp. 769–774, "Correlation of Low Density Polyethylene Rheological Measurements with Optical and Processing Properties", by M. Shida, R. N. Shroff, and L. V. Cancio.

"A Review of High Resolution Liquid ¹³Carbon Nuclear Magnetic Resonance Characterizations of Ethylene–Based Polymers", pp. 201–317, by James C. Randall.

(List continued on next page.)

*Primary Examiner*—Donald R. Wilson

[57] ABSTRACT

The subject invention provides a polymer mixture having high heat resistivity, low hexane extractive and controllably lower or higher modulus. The mixture is comprised of at least one first substantially linear ethylene polymer, Component (A), and at least one second ethylene polymer which is a homogeneously branched polymer, heterogeneously branched linear polymer or a non-short chain branched linear polymer. When fabricated into film, the mixture is characterized by a heat seal initiation temperature which is substantially lower than its Vicat softening point as well as a high ultimate hot tack strength. When fabricated as a molded article, the mixture is characterized by high microwave warp distortion while maintaining a lower modulus. The polymer mixture is particularly well-suited for use in multilayer film structures as a sealant layer for such applications as cook-in packages, hot-fill packages, and barrier shrink films. In molding applications, the mixture is well-suited as freezer-to-microwave food storage containers and lids which maintain good flexibility at low temperature to allow easy openability of such containers.

16 Claims, 6 Drawing Sheets

U.S. PATENT DOCUMENTS

| | | |
|---|---|---|
| 4,339,507 | 7/1982 | Kurtz et al. . |
| 4,340,640 | 7/1982 | Weiner . |
| 4,340,641 | 7/1982 | Weiner . |
| 4,346,834 | 8/1982 | Mazumdar . |
| 4,348,346 | 9/1982 | Thompson . |
| 4,349,648 | 9/1982 | Jorgensen et al. . |
| 4,352,844 | 10/1982 | Bornstein . |
| 4,352,849 | 10/1982 | Mueller . |
| 4,354,009 | 10/1982 | Goeke et al. . |
| 4,359,495 | 11/1982 | Schroeder et al. . |
| 4,359,553 | 11/1982 | Edwards . |
| 4,359,561 | 11/1982 | Fraser et al. . |
| 4,363,904 | 12/1982 | Fraser et al. . |
| 4,365,044 | 12/1982 | Liu . |
| 4,367,256 | 1/1983 | Biel . |
| 4,370,456 | 1/1983 | George . |
| 4,378,451 | 3/1983 | Edwards . |
| 4,379,197 | 4/1983 | Cipriani et al. . |
| 4,380,567 | 4/1983 | Shigemoto . |
| 4,383,095 | 5/1983 | Goeke et al. . |
| 4,387,185 | 6/1983 | Schroeder et al. . |
| 4,390,573 | 6/1983 | Bullard et al. . |
| 4,390,677 | 6/1983 | Karol et al. . |
| 4,391,862 | 7/1983 | Bornstein et al. . |
| 4,399,180 | 8/1983 | Briggs . |
| 4,405,774 | 9/1983 | Miwa et al. ............................ 526/348.2 |
| 4,410,649 | 10/1983 | Cieloszyk . |
| 4,418,114 | 11/1983 | Briggs et al. . |
| 4,421,162 | 12/1983 | Tollar . |
| 4,424,138 | 1/1984 | Candlin et al. . |
| 4,427,573 | 1/1984 | Miles et al. . |
| 4,427,833 | 1/1984 | Edwards . |
| 4,429,079 | 1/1984 | Shibata et al. ........................... 525/240 |
| 4,438,238 | 3/1984 | Fukushima et al. .................... 525/240 |
| 4,438,243 | 3/1984 | Kashiwa et al. . |
| 4,452,958 | 6/1984 | Chester et al. . |
| 4,454,281 | 6/1984 | Heitz et al. . |
| 4,461,792 | 7/1984 | Anthony . |
| 4,461,873 | 7/1984 | Bailey et al. . |
| 4,463,153 | 7/1984 | Mizutani et al. . |
| 4,464,426 | 8/1984 | Anthony . |
| 4,465,812 | 8/1984 | Moriguchi et al. . |
| 4,467,065 | 8/1984 | Williams et al. . |
| 4,474,740 | 10/1984 | Gross et al. . |
| 4,482,687 | 11/1984 | Noshay et al. . |
| 4,485,217 | 11/1984 | Gunter et al. . |
| 4,486,377 | 12/1984 | Lucchesi et al. . |
| 4,486,552 | 12/1984 | Niemann ................................. 523/169 |
| 4,486,579 | 12/1984 | Machon et al. . |
| 4,505,970 | 3/1985 | Craver . |
| 4,510,303 | 4/1985 | Oda et al. . |
| 4,513,038 | 4/1985 | Anthony . |
| 4,514,465 | 4/1985 | Schoenberg . |
| 4,519,968 | 5/1985 | Klaus et al. . |
| 4,526,919 | 7/1985 | Edwards ................................. 524/232 |
| 4,528,312 | 7/1985 | Edwards ................................. 524/232 |
| 4,530,914 | 7/1985 | Ewen et al. . |
| 4,532,189 | 7/1985 | Mueller . |
| 4,542,886 | 9/1985 | Yoshimura et al. ...................... 264/22 |
| 4,544,762 | 10/1985 | Kaminsky et al. ..................... 556/179 |
| 4,547,475 | 10/1985 | Glass et al. . |
| 4,547,551 | 10/1985 | Bailey et al. . |
| 4,547,555 | 10/1985 | Cook et al. . |
| 4,551,380 | 11/1985 | Schoenberg . |
| 4,563,504 | 1/1986 | Hert et al. . |
| 4,564,063 | 1/1986 | Tollar . |
| 4,564,559 | 1/1986 | Wagner . |
| 4,568,713 | 2/1986 | Hansen et al. . |
| 4,587,318 | 5/1986 | Inoue et al. . |
| 4,588,650 | 5/1986 | Mientus et al. . |
| 4,588,794 | 5/1986 | Oda . |
| 4,593,009 | 6/1986 | Nowlin . |
| 4,597,920 | 7/1986 | Golike . |
| 4,598,128 | 7/1986 | James et al. . |
| 4,599,391 | 7/1986 | Yamamoto et al. . |
| 4,599,392 | 7/1986 | McKinney et al. ................... 526/318.6 |
| 4,608,221 | 8/1986 | Kurtz et al. ............................. 264/556 |
| 4,612,300 | 9/1986 | Coleman, III . |
| 4,613,547 | 9/1986 | Wagner et al. . |
| 4,617,241 | 10/1986 | Mueller . |
| 4,618,662 | 10/1986 | Nowlin . |
| 4,624,991 | 11/1986 | Haas . |
| 4,626,467 | 12/1986 | Hostetter . |
| 4,626,574 | 12/1986 | Cancio et al. .......................... 525/240 |
| 4,629,771 | 12/1986 | Candlin et al. . |
| 4,632,801 | 12/1986 | Dowd . |
| 4,640,856 | 2/1987 | Ferguson et al. . |
| 4,643,926 | 2/1987 | Mueller . |
| 4,649,001 | 3/1987 | Nakamura et al. . |
| 4,659,685 | 4/1987 | Coleman, III et al. . |
| 4,666,772 | 5/1987 | Schinkel et al. . |
| 4,666,999 | 5/1987 | Cook et al. . |
| 4,668,463 | 5/1987 | Cancio et al. .......................... 264/556 |
| 4,668,575 | 5/1987 | Schinkel et al. . |
| 4,668,650 | 5/1987 | Lo et al. . |
| 4,668,752 | 5/1987 | Tominari et al. . |
| 4,672,096 | 6/1987 | Nowlin . |
| 4,676,922 | 6/1987 | Sommer . |
| 4,677,087 | 6/1987 | Lo et al. . |
| 4,690,991 | 9/1987 | Seppl . |
| 4,690,992 | 9/1987 | Grubbs et al. . |
| 4,692,386 | 9/1987 | Schinkel et al. . |
| 4,701,432 | 10/1987 | Welborn, Jr. . |
| 4,710,538 | 12/1987 | Jorgensen . |
| 4,714,638 | 12/1987 | Lustig et al. . |
| 4,716,207 | 12/1987 | Cozewith et al. . |
| 4,719,193 | 1/1988 | Levine et al. . |
| 4,720,427 | 1/1988 | Clauson et al. . |
| 4,722,971 | 2/1988 | Datta et al. . |
| 4,724,185 | 2/1988 | Shah . |
| 4,732,882 | 3/1988 | Allen et al. . |
| 4,737,391 | 4/1988 | Lustig et al. . |
| 4,742,138 | 5/1988 | Kageyama . |
| 4,755,403 | 7/1988 | Ferguson . |
| 4,755,419 | 7/1988 | Shah . |
| 4,762,898 | 8/1988 | Matsuura et al. . |
| 4,764,549 | 8/1988 | Greenhalgh et al. . |
| 4,767,485 | 8/1988 | Michiels ............................. 156/244.11 |
| 4,770,912 | 9/1988 | Furrer et al. . |
| 4,775,710 | 10/1988 | Dunski et al. . |
| 4,780,264 | 10/1988 | Dohrer et al. .......................... 264/556 |
| 4,786,688 | 11/1988 | Thiersault et al. . |
| 4,788,232 | 11/1988 | Needham . |
| 4,789,714 | 12/1988 | Cozewith et al. . |
| 4,792,595 | 12/1988 | Cozewith et al. . |
| 4,798,081 | 1/1989 | Hazlitt et al. ............................... 73/53 |
| 4,801,486 | 1/1989 | Quacquarella et al. . |
| 4,801,652 | 1/1989 | Mizutani et al. . |
| 4,803,122 | 2/1989 | Schirmer . |
| 4,803,253 | 2/1989 | McDaniel et al. . |
| 4,808,262 | 2/1989 | Aneja et al. . |
| 4,808,635 | 2/1989 | Nguyen . |
| 4,820,557 | 4/1989 | Warren . |
| 4,820,589 | 4/1989 | Dobreski et al. . |
| 4,824,889 | 4/1989 | Mostert . |
| 4,824,912 | 4/1989 | Su . |
| 4,826,939 | 5/1989 | Stuart . |
| 4,828,906 | 5/1989 | Nishimura et al. . |
| 4,830,926 | 5/1989 | Mostert . |
| 4,833,017 | 5/1989 | Benoit . |
| 4,834,947 | 5/1989 | Cook et al. . |
| 4,842,187 | 6/1989 | Janocha et al. . |

| | | |
|---|---|---|
| 4,842,930 | 6/1989 | Schinkel . |
| 4,842,951 | 6/1989 | Yamada et al. . |
| 4,843,129 | 6/1989 | Spenadel et al. . |
| 4,857,611 | 8/1989 | Durand et al. . |
| 4,859,379 | 8/1989 | Chiang ........ 264/25 |
| 4,863,769 | 9/1989 | Lustig et al. . |
| 4,863,784 | 9/1989 | Lustig et al. . |
| 4,865,902 | 9/1989 | Golike et al. . |
| 4,874,820 | 10/1989 | Cozewith et al. . |
| 4,876,321 | 10/1989 | Lo et al. . |
| 4,882,406 | 11/1989 | Cozewith et al. . |
| 4,883,853 | 11/1989 | Hobes et al. . |
| 4,886,690 | 12/1989 | Davis et al. . |
| 4,888,318 | 12/1989 | Allen et al. . |
| 4,892,911 | 1/1990 | Genske . |
| 4,921,920 | 5/1990 | Collomb-Ceccarini et al. . |
| 4,923,750 | 5/1990 | Jones . |
| 4,925,728 | 5/1990 | Crass et al. . |
| 4,927,708 | 5/1990 | Herran et al. . |
| 4,935,474 | 6/1990 | Ewen et al. . |
| 4,937,112 | 6/1990 | Schirmer . |
| 4,937,299 | 6/1990 | Ewen et al. . |
| 4,952,451 | 8/1990 | Mueller . |
| 4,954,391 | 9/1990 | Kotani et al. . |
| 4,957,790 | 9/1990 | Warren . |
| 4,957,972 | 9/1990 | Shirodkar . |
| 4,959,436 | 9/1990 | Cozewith et al. . |
| 4,960,878 | 10/1990 | Crapo et al. . |
| 4,963,388 | 10/1990 | Benoit . |
| 4,963,419 | 10/1990 | Lustig et al. . |
| 4,963,427 | 10/1990 | Botto et al. . |
| 4,966,951 | 10/1990 | Benham et al. . |
| 4,967,898 | 11/1990 | Lustig et al. . |
| 4,968,765 | 11/1990 | Yagi et al. . |
| 4,975,315 | 12/1990 | Bolthe et al. . |
| 4,976,898 | 12/1990 | Lustig et al. . |
| 4,977,022 | 12/1990 | Mueller . |
| 4,981,760 | 1/1991 | Naito et al. ............ 428/523 |
| 4,981,826 | 1/1991 | Speca . |
| 4,983,447 | 1/1991 | Crass et al. . |
| 4,987,212 | 1/1991 | Morterol et al. . |
| 4,988,465 | 1/1991 | Lustig et al. . |
| 4,996,094 | 2/1991 | Dutt . |
| 5,006,396 | 4/1991 | VanBortel et al. . |
| 5,006,398 | 4/1991 | Banerji . |
| 5,011,891 | 4/1991 | Spenadel et al. . |
| 5,013,801 | 5/1991 | Cozewith et al. . |
| 5,015,511 | 5/1991 | Treybig et al. . |
| 5,015,749 | 5/1991 | Schmidt et al. ........ 556/179 |
| 5,019,315 | 5/1991 | Wilson . |
| 5,024,799 | 6/1991 | Harp et al. . |
| 5,025,072 | 6/1991 | Nowlin et al. . |
| 5,026,610 | 6/1991 | Harrison . |
| 5,026,798 | 6/1991 | Canich ........ 526/127 |
| 5,028,663 | 7/1991 | Chung . |
| 5,032,463 | 7/1991 | Smith . |
| 5,041,316 | 8/1991 | Parnell et al. . |
| 5,041,501 | 8/1991 | Shirodkar . |
| 5,041,583 | 8/1991 | Sangokoya . |
| 5,041,584 | 8/1991 | Crapo et al. ........ 556/179 |
| 5,041,585 | 8/1991 | Deavenport et al. ........ 556/179 |
| 5,043,040 | 8/1991 | Butler . |
| 5,047,468 | 9/1991 | Lee et al. . |
| 5,055,328 | 10/1991 | Evert et al. . |
| 5,055,338 | 10/1991 | Sheth et al. . |
| 5,055,438 | 10/1991 | Canich ........ 502/117 |
| 5,055,533 | 10/1991 | Allen et al. . |
| 5,055,534 | 10/1991 | Theobald . |
| 5,057,475 | 10/1991 | Canich et al. . |
| 5,059,481 | 10/1991 | Lustig et al. . |
| 5,064,796 | 11/1991 | Speca . |
| 5,064,802 | 11/1991 | Stevens et al. ........ 502/155 |
| 5,066,738 | 11/1991 | Ewen . |
| 5,068,489 | 11/1991 | Edwards et al. . |
| 5,073,452 | 12/1991 | Satou et al. . |
| 5,073,599 | 12/1991 | Genske . |
| 5,075,143 | 12/1991 | Bekele . |
| 5,077,255 | 12/1991 | Welborn, Jr. . |
| 5,079,205 | 1/1992 | Canich . |
| 5,082,908 | 1/1992 | Imai et al. . |
| 5,084,039 | 1/1992 | Cancio et al. . |
| 5,084,134 | 1/1992 | Mattiussi et al. . |
| 5,084,534 | 1/1992 | Welborn, Jr. et al. . |
| 5,084,540 | 1/1992 | Albizzati et al. . |
| 5,084,927 | 2/1992 | Parkevich . |
| 5,086,024 | 2/1992 | Crapo et al. . |
| 5,089,321 | 2/1992 | Chum et al. . |
| 5,091,228 | 2/1992 | Fujii et al. . |
| 5,096,867 | 3/1992 | Canich . |
| 5,102,955 | 4/1992 | Calabro et al. . |
| 5,106,545 | 4/1992 | Warren . |
| 5,106,688 | 4/1992 | Bradfute et al. . |
| 5,112,674 | 5/1992 | German et al. . |
| 5,118,753 | 6/1992 | Hikasa et al. . |
| 5,132,074 | 7/1992 | Isozaki et al. . |
| 5,153,039 | 10/1992 | Porter et al. . |
| 5,189,106 | 2/1993 | Morimoto et al. ........ 525/240 |
| 5,206,075 | 4/1993 | Hodgson, Jr. ........ 428/516 |
| 5,218,071 | 6/1993 | Tsutsui et al. ........ 526/348 |
| 5,241,031 | 8/1993 | Mehta ........ 526/348.1 |
| 5,242,922 | 9/1993 | Shirodkar . |
| 5,258,161 | 11/1993 | Ealer . |
| 5,272,236 | 12/1993 | Lai et al. ........ 526/348.5 |
| 5,278,272 | 1/1994 | Lai et al. ........ 526/348.5 |
| 5,288,531 | 2/1994 | Falla et al. . |
| 5,374,700 | 12/1994 | Tsutsui et al. ........ 526/348.3 |
| 5,380,810 | 1/1995 | Lai et al. ........ 526/352 |
| 5,395,471 | 3/1995 | Obijeski et al. ........ 156/244.11 |
| 5,395,810 | 3/1995 | Shamshoum et al. ........ 502/113 |
| 5,408,004 | 4/1995 | Lai et al. ........ 525/240 |
| 5,444,145 | 8/1995 | Brant et al. ........ 526/348.3 |

FOREIGN PATENT DOCUMENTS

| | | |
|---|---|---|
| 0333508A2 | 9/1989 | European Pat. Off. . |
| 0404368A2 | 12/1990 | European Pat. Off. . |
| 404368A2 | 12/1990 | European Pat. Off. . |
| 0404969A1 | 1/1991 | European Pat. Off. . |
| 0416815A2 | 3/1991 | European Pat. Off. . |
| 416815A2 | 3/1991 | European Pat. Off. . |
| 420436A1 | 4/1991 | European Pat. Off. . |
| 0 447 035 A3 | 9/1991 | European Pat. Off. ...... C08F 297/08 |
| 447035A1 | 9/1991 | European Pat. Off. . |
| 452920A2 | 10/1991 | European Pat. Off. . |
| 0217252B1 | 11/1991 | European Pat. Off. . |
| 495099A1 | 7/1992 | European Pat. Off. . |
| 503791A1 | 9/1992 | European Pat. Off. . |
| 536104A1 | 4/1993 | European Pat. Off. . |
| 0 597 502 A2 | 5/1994 | European Pat. Off. . |
| 0 600 425 A1 | 6/1994 | European Pat. Off. . |
| 942363 | 11/1963 | United Kingdom . |
| 1065568 | 4/1967 | United Kingdom . |
| 2123747 | 2/1984 | United Kingdom . |
| 2206890 | 1/1989 | United Kingdom . |
| WO 90/03414 A1 | 4/1990 | WIPO ........ C08L 23/08 |
| 90/03414 | 5/1990 | WIPO . |
| 9003414 | 5/1990 | WIPO . |
| 9104257 | 4/1991 | WIPO . |
| 9106426 | 5/1991 | WIPO . |
| 9109882 | 7/1991 | WIPO . |
| 9200333 | 1/1992 | WIPO . |
| 92/14784 | 3/1992 | WIPO . |
| 9214784 | 9/1992 | WIPO . |
| 94/06857 | 9/1992 | WIPO . |

| | | | |
|---|---|---|---|
| 93/03093 | 2/1993 | WIPO . | |
| WO 93/03093 A1 | 2/1993 | WIPO | C08L 23/04 |
| 9307210 | 4/1993 | WIPO . | |
| 9308221 | 4/1993 | WIPO . | |
| WO 93/08221 A2 | 4/1993 | WIPO | C08F 10/00 |
| WO 93/13143 A1 | 7/1993 | WIPO | C08F 10/02 |
| WO 94/06857 A1 | 3/1994 | WIPO | C08L 23/04 |
| 94/07930 | 4/1994 | WIPO . | |
| 94/07954 | 4/1994 | WIPO . | |
| WO 94/12568 A1 | 6/1994 | WIPO | C08L 23/08 |
| 94/18263 | 8/1994 | WIPO . | |
| 94/28064 | 8/1994 | WIPO . | |
| 94/12568 A1 | 9/1994 | WIPO | C08L 23/08 |
| WO 95/05942 A1 | 3/1995 | WIPO | B32B 27/32 |
| WO 95/13321 A1 | 5/1995 | WIPO | C08L 23/04 |

OTHER PUBLICATIONS

*ACS Symposium Series*, No. 142, pp. 94–118. "Characterization of Long–Chain Branching in Polyethylenes Using High–Field Carbon–13 NMR", by J. C. Randall.

SPE Regional Technical Conference, Quaker Square Hilton, Akron, Ohio, Oct. 1–2, (1985), pp. 107–119, "The Role of Comonomer Type and Distribution in LLDPE Product Performance", by L. D. Cady.

*Journal of Polymer Science:Polymer Physics Edition*, vol. 20, pp. 441–455 (1982), "Determination of Branching Distributions in Polyethylene and Ethylene Copolymers", by L. Wild, T. R. Ryle, D. C. Knobeloch, and I. R. Peat.

*Antec 93*, pp. 58–62, "Flexomer Polyolefins, A Unique Class of Ethylene Copolymers for Low Temperature Film Applications", by D.C. Eagar, G. E. Ealer, S. A. Bartocci and D. M. Kung.

Worldwide Metallocene Conference MetCon '94, May 25–27, (1994), "Improved Processing and Performance Balance of Polyethylene Resins Using Metallocene Catalyst Technology", by Mark A. Wendorf.

Speciality Plastics Conference 1990—The Raw Materials Scenario for PE and PP Film Applications and Markets, Dec. 3–4, "High Value Added Film Using an Olefin Based Elastomer", by M. Tanaka.

*Packaging Technology and Engineering*, Apr. 1994, pp. 34–37, "Single–Site Catalysts Produce Tailor–Made, Consistent Resins", by David F. Simon.

"Polyolefin Modification with EXACT™ Plastomers", (before Jul./1994 and after Sep./1992), pp. 539–564, by T. C. Yu, G. J. Wagner.

*Journal of Polymer Science*, Part A, vol. 1 (pp. 2869–2880 (1963)), "Long–Chain Branching Frequency in Polyethylene" by J.E. Guillet.

*Polymer Preprints, Amer. Chem. Society*, vol. 12, No. 1. pp. 277–281 (Mar. 1971), "Evidence of Long–chain Branching in High Density Polyethylene" by E.e. Drott and R.A. Mendelson.

*Journal of the American Chemical Society*, 98:7, pp. 1729–1742 (Mar. 31, 1976) "Structure and Chemistry of Bis(cyclopentadienyl)–MLn Complexes" by Joseph W. Lauber and Roald Hoffman.

*Polymer Engineering and Science*, vol. 16, No. 12, pp. 811–817 (Dec. 1976), "Influence of Long–Chain Branching on the Viscoelastic Properties of Low–Density Polyethylenes" by L. Wild, R. Ranganath, and D. Knobeloch.

*Angew. Chem. Int. Ed. Engl*, pp. 630–632 (1976) vol. 15, No. 10, "Halogen–Free Soluble Ziegler Catalysts for the Polymerization of Ethylene. Control of Molecular Weight by Choice of Temperature" by Arne Andersen et al.

*Advances in Organometallic Chemistry*, pp. 99–148, vol. 18, (1980) "Ziegler–Natta Catalysis" by Hansjorg Sinn and Walter Kaminsky.

*Angew. Chem. Int. Ed. Engl.*, pp. 390–393, vol. 19 No. 5(1980) "'Living Polymers' on Polymerization with Extremely Productive Ziegler Catalysts" by Hansjorg Sinn, Walter Kaminsky, Hans–Jurgen Vollmer, and Rudiger Woldt.

*Polymer Bullentin*, 9, pp. 464–469 (1983) "Halogen Free Soluble Ziegler Catalysts with Methylalumoxan as Catalyst" by Jens Herwig and Walter Kaminsky.

*Makromol. Chem., Rapid Commun.*, 4, pp. 417–421 (1983) "Bis(cyclopentadienyl)zirkon–Verbingungen und Aluminoxan als Ziegler–Katalysatoren fur die Polymerisation und Copolymerisation von Olefinen" by Walter Kaminsky et al.

*ANTEC Proceedings*, pp. 306–309 (1983), "Analysis of Long Chain Branching in High Density Polyethylene" by J.K. Hughes.

*Makromol. Chem., Rapid Commun.*, (5) pp. 225–228 (1984) "Influence of hydrogen on the polymerization of ethylene with the homogeneous Ziegler system bis(cyclopentadienyl)zirconiumdicholoride/aluminoxane" by Walter Kaminsky et al.

*Journal of Polymer Science: Polymer Chemistry Edition*, pp. 2117–2133(1985) vol. 23, "Homogeneous Ziegler–Natta Catalysis. II. Ethylene Polymerization by IVB Transition Metal Complexes/Methyl Aluminoxane Catalyst Systems" by E. Giannetti and R. Mazzocchi.

*Journal of Applied Polymer Science*, pp. 3751–3765(1985) vol. 30, "On the Effects of Very Low Levels of Long Chain Branching on Rheological Behavior in Polyethylene" by B. H. Bersted.

*Journal of Polymer Science: Polymer Chemistry Edition*, pp. 2151–2164 (1985) vol. 23, "Ethylene Propylene Diene Terpolymers Produced with a Homogeneous and Highly Active Zirconium Catalyst" by Walter Kaminsky et al.

*The Society of Rheology*, pp. 337–357 (1986) vol. 30, "Wall Slip in Viscous Fluids and Influence of Materials of Construction" by A. V. Ramamurthy.

*Makromol. Chem., Macromol. Symp.*, 4, pp. 103–118 (1986) "Elastomers By Atactic Linkage of α–Olefins Using Soluble Ziegler Catalysts" by W. Kaminsky and M. Schlobohm.

*Journal of Rheology*, 31 (8) pp. 815–834 (1987) "Wall Slip and Extrudate Distortion in Linear Low–Density Polyethylene" by D. Kalika and M. Denn.

*Makromol. Chem.*, 190, pp. 515–526(1989) "Copolymerization of Cycloalkenes with Ethylene In Presence of Chiral Zirconocene Catalysts" by W. Kaminsky and R. Spiehl.

*Journal of Non–Newtonian Fluid Mechanics*, 36, pp. 255–263 (1990) "Additional Observations on The Surface Melt Fracture Behavior Of Linear Low–Density Polyethylene" by R. Moynihan, D. Baird, and R. Ramanathan.

*Makromol. Chem. Rapid Commun.*, pp. 89–94 (1990) "Terpolymers of Ethylene, Propene and 1,5–Hexadiene Synthesized with Zirconocene/Methylaluminoxane" by W. Kaminsky and H. Drogemuller.

*Journal of Rheology*, 35(4), 3 (May, 1991) pp. 497–552, "Wall Slip of Molten High Density Polyethylene. I. Sliding Plate Rheometer Studies" by S.G. Hatzikiriakos and J.M. Dealy.

*Proceedings of the 1991 IEEE Power Engineering Society*, pp. 184–190 (Sep. 22–27, 1991), "New Specialty Linear Polymers (SLP) For Power Cables" by Monica Hendewerk and Lawrence Spenadel.

*Society of Plastic Engineers Proceedings*, Polyolefins VII International Conference, Feb. 24–27, 1991, "Structure/Property Relationships in Exxpol™ Polymers" (pp. 45–66) by C. Speed, B. Trudell, A. Mehta, and F. Stehling.

*1991 Specialty Polyolefins Conference Proceedings*, "The Marketing Challenge Created By Single Site Catalysts in Polyolefins," Sep. 24, 1991, (pp. 41–45) by Michael P. Jeffries.

*High Polymers*, vol. XX, "Crystalline Olefin Polymers" Part I, pp. 495–501.

*1991 Polymers, Laminations & Coatings Conference*, TAPPI Proceedings, presented in Feb., 1991, pp. 289–296. "A New Family of Linear Ethylene Polymers with Enhanced Sealing Performance" by D. Van der Sanden and R. W. Halle.

*Society of Plastic Engineers 1991 Specialty Polyolefins Conference Proceedings*, pp. 41–55, "The Marketing Challenge Created by Single Site Catalysts in Polyolefins" by M. Jefferies (Sep. 24, 19910.

*Advances In Polyolefins*, by R. B. Seymour and T. Cheng, (1987), pp. 373–380 "Crystallinity and Morphology of Ethylene/α–Olefin Copolymers" by P. Schouterden, G. Groeninckx, and H. Reynaers.

*Advances In Polyolefins*, by R. B. Seymour and T. Cheng, (1987) "New Catalysis and Process For Ethylene Polymerization", pp. 337–354, by F. Karol, B. Wagner, I. Levine, G. Goeke, and A Noshay.

*Advances In Polyolefins*, by R. B. Seymour and T. Cheng, (1987) "Polymerization of Olefins With A Homogeneous Zirconium/Alumoxane Catalyst", pp. 361–371 by W. Kaminsky and H. Hahnsen.

*The Encyclopedia of Chemical Technology*, Kirk–Othmer, Third Edition, John Wiley & Sons, New York, 1981, vol. 18, pp. 191–192.

K. R. Osborn and W. A. Jenkins in "Plastic Films, Technology and Packaging Applications" (Technomic Publishing Co., Inc. (1992)).

Wild et al, *Journal of Polymer Science, Poly. Phys., Ed.* vol. 20, p. 441 (1982).

"Packaging Machinery Operations: No. 8, Form–Fill–Sealing, A Self–Instructional Course" by C. G. Davis, Packaging Machinery Manufacturers Institute (Apr. 1982).

"The Wiley Encyclopedia of Packaging Technology" by M. Bakker (Editor), John Wiley & Sons (1986)(pp. 334, 364–369).

*Packaging: An Introduction*, by S. Sacharow and A. L. Brody, Harcourt Brace Javanovich Publications, Inc.(1987)(pp. 322–326).

"Laminations Vs. Coextrusion" by D. Dumbleton, Converting Magazine, Sep. 1992.

*Packaging Foods With Plastics*, by Wilmer A. Jenkins and James P. Harrington (1991).

"Coextrusion Basics" by Thomas I. Butler, *Film Extrusion Manual: Process, Materials, Properties*, pp. 31–80(published by TAPPI Press (1992)).

"Coextrusion for Barrier Packaging" by W.J. Schrenk and C.R. Finch, *Society of Plastics Engineers RETEC Proceedings*, Jun. 15–17 (1981), pp. 211–229.

*1991 Polymers, Laminations & Coatings Conference Proceedings*, pp. 289–296, "A New Family of Linear Ethylene Polymers Provides Enhanced Sealing Performance" by Dirk G.F. Van der Sanden and Richard Halle.

*ANTEC '92 Proceedings*, pp. 154–158 ("Exact™ Linear Ethylene Polymers for Enhanced Sealing Performance" by D. Van der Sanden and R. W. Halle).

*1992 Polymers, Laminations & Coatings Conference Proceedings*, "A New Family of Ethylene Polymers with Enhanced Sealing Performance designed for Multilayer Barrier Packaging Films" by D. Van Sandern and R. W. Halle.

Randall (*Rev. Macromol. Chem. Phys.*, C29(2&3), pp. 285–297,.

Modern Plastics International, vol. 23, No. 8, Aug. 1993, pp. 40–41, Don Schwank "Single–site metallocene catalysts yield tailor–made polyolefin resins".

"LLDPE Blends Perk Up Performance of PE Films" *Plastics World*, pp. 40–43, (Dec. 1982).

Modern Plastics—1963ED–1962, p. 227.

Japanese Abstract JP 58–222131 (23 Dec. 1983).

Japanese Abstract JP 61–009446 (17 Jan. 1986).

*The Encyclopedia of Chemical Technology*, Kirt–Othmer, Third Edition, John Wiley & Sons, New York, 1981, vol. 16, pp. 415–417.

Feb. 1992 Tappai Journal, pp. 99–103, "A New Family of Linear Ethylene Polymers Provides Enhanced Sealing Performance" by Van der Sanden et al.

Roberts et al., *ANTEC Proceedings '85*, "New Process for the Reduction of Draw Resonance in Melt Embossing and Extrustion Coating", pp. 104–107.

Lucchesi et al., *Plastics Engineering*, "Reducing draw resonance in LLDPE film resins", pp. 87–90, May 1985.

*ANTEC Proceedings 1989*, "Resistance to Draw Resonance of Linear Low Density Polyethylene Through Improved Resin Design", pp. 28–30.

Randall, *ACS Symposium Series No. 142*, "Polymer Characterization by ESR and NMR", pp. 93–117 (1980).

Williams and Ward, *Journal of Polymer Science: Polymer Letters.*, vol. 6, "The Construction of a Calibration Curve for Gel Permeation Chromatography using Polystyrene Fractions", pp. 621–627, (1968).

L. K. Mergenhagen and N. F. Whiteman, "Plastomers as Sealants in Packaging Applications", TAPPI Proceedings, 1993.

*Modern Plastics Encyclopedia*, vol. 65, No. 11, pp. 110 & 112, 1989, "Introduction to TPEs" by Charles D. Shedd.

*Modern Plastics Encyclopedia*, vol. 65, No. 11, p. 112, 1989, "Elastomeric Alloy TPEs" by C.P. Rader.

*Modern Plastics Encyclopedia*, vol. 65, No. 11, pp. 112–113, 1989, "Engineering TPEs" by Thomas W. Sheridan.

"FLEXOMER™ Polyolefins: A Bridge Between Polyethylene And Rubbers" by M. R. Rifi, H. K. Ficker and M. A. Corwin, pp. 1–7, 1990. Union Carbide Chemicals and Plastics Inc., Bound Brook, New Jersey.

SPO '92 "Future Trends in Polyolefins Technology" by douglas M. Selman, pp. 11–16 (Sep. 23, 1992).

SPO '92 Proceedings, "The Material Properties of Polymers Made From Constrained Geometry Catalysts" by Kurt W. Swogger, pp. 155–165 (1992).

POLYOLEFIN COMPOSITIONS EXHIBITING HEAT RESISTIVITY, LOW HEXANE-EXTRACTIVES AND CONTROLLED MODULUS

CROSS REFERENCE TO RELATED APPLICATIONS

This application is a Rule 1.60 divisional of application Ser. No. 08/327,156, filed Oct. 21, 1994, now abandoned which is related to the following pending applications: U.S. patent application Ser. No. 08/054,379, filed on Apr. 28, 1993, now abandoned. U.S. patent application Ser. No. 08/010,958, filed on Jan. 29, 1993, now abandoned. U.S. patent application Ser. No. 08/239,495, filed on May 9, 1994, now abandoned, and U.S. patent application Ser. No. 08/239,496, filed on May 9, 1994, now abandoned, the disclosures of all of which are incorporated herein by reference.

FIELD OF THE INVENTION

This invention pertains to a polyolefin composition comprising at least two polymer material components. Particular embodiments of this invention, such a composition, or a film, coating or molding fabricated from such a composition, will be characterized as having a high heat resistivity, high percent residual crystallinity, low level of hexane extractives, low heat seal and hot tack initiation temperatures, high hot tack strength and controlled modulus.

BACKGROUND OF THE INVENTION

Although polyolefin resins have long found utility in food packaging and food storage container applications, a polyolefin resin with the desired balance of properties in the form of a film, coating and molding has not been available to fabricators and packagers. An optimum polyolefin resin for packaging and storage applications would possess a number of key performance properties. In particular, an optimum resin would be characterized by a high percent residual crystallinity and/or high Vicat softening point (indicating high heat resistivity which is important, for example, for microwavable food container and in hot-fill film packaging applications); a controllably high or low modulus (indicating good dimensional stability which is important for efficient product loading and bag-making operations or indicating good openability of refrigerated food containers, respectively); a low heat seal and hot tack temperature (indicating the ability to readily convert films and coatings into packages); high tear, dart impact resistance and puncture resistance (indicating greater package or container integrity under abuse); and a low level of hexane extractives (indicating a lower tendency for low molecular weight impurities or polymer fractions to migrate into sensitive packaged goods such as foodstuffs in food contact applications).

Traditionally, enhancement of one particular resin property has required some sacrifice with respect to another important resin property. For instance, low modulus, low heat seal and hot tack initiation temperatures, high tear strength, high dart impact resistance and high puncture resistance are typically achieved by increasing the comonomer content of the resin. In contrast, high crystallinity, high Vicat softening points, high modulus and low levels of n-hexane extractives are typically achieved by decreasing the comonomer content of the resin. Accordingly, improving the resin with respect to one class of properties has been historically achieved to the detriment of other properties.

One particular problem which has confronted industry is that the Vicat softening point of a resin and the heat seal initiation or hot tack initiation temperatures of a film layer fabricated from such a resin have been historically viewed as directly related. That is, while preferred resins will have a high Vicat softening point to promote heat resistivity, such improved heat resistivity traditionally comes at the cost of increased heat seal initiation and hot tack temperatures, which imposes decreased packaging line speeds and increased energy costs upon the package fabricator. Also, conventional resins typically have heat seal and hot tack initiation temperatures that either approximate their respective Vicat softening points or, more undesirably, are higher than their respective Vicat softening points. Thus, it is presently desirable to maximize the difference between the Vicat softening point of a resin and the heat seal and/or hot tack initiation temperature of a film layer fabricated from that resin as well as to provide polymer compositions that are characterized as having initiation temperatures more than 6° C. lower than their respective Vicat softening points such that packages having high heat resistivity and high ultimate hot strength may be more economically prepared.

Another particular problem which has confronted industry is that while ethylene alpha-olefin polymers having a higher comonomer content, (i.e., a density less than about 0.900 g/cc) yield films and coatings that exhibit good performance in terms of low heat seal and hot tack initiation temperatures, tear strength, dart impact resistance and puncture resistance, such polymers either exhibit excessive n-hexane extractives or are substantially soluble in n-hexane. In contrast to simple extraction, which pertains to the solubilizing of low molecular weight impurities, polymer fractions or degradation products which represent only small portions of the total polymer, substantially complete solubility in n-hexane is attributable to higher degrees of polymer amorphosity, i.e., a lower degree of crystallinity characteristic of interpolymers having a higher comonomer content.

Hexane-soluble materials and materials with high n-hexane extractives levels generally are not acceptable for use in direct food contact applications, such as sealant layers in multilayer film packages or injection molded food storage containers. Even where these materials are used for food packaging and storage in general, or for packaging and storing taste and odor sensitive goods, a substantial barrier material (such as, for example, aluminum foil) must be used between the material and the packaged or stored item. Accordingly, industry has historically been limited with respect to the utilization of lower density ethylene alpha-olefin resins having excellent heat seal and hot tack initiation performance and abuse properties in food contact applications as well as other applications involving taste or odor sensitive goods. Thus, it is also desirable to provide an ethylene alpha-olefin polymer composition having the beneficial performance attributes of ethylene alpha-olefin resins having densities less than 0.900 g/cc (e.g., attributes which indicate their utility as films and coatings having improved abuse properties and lower heat seal and hot tack initiation temperatures), but which are characterized by reduced levels of hexane extractives, making such polymer compositions suitable for use in food contact applications.

Still another problem that has plagued the plastic industry is the unavailability of optimum molding compositions for fabricating improved lids for freezer-to-microwave food containers. Such compositions should have good flexibility (i.e., a lower flexural modulus) to insure easy openability while the container is still at freezer or refrigerator temperatures, yet such compositions should also have good heat resistance to prevent undo melting, softening or distortion of lids when the container and foodstuff is microwaved. Easy lid openability and removal is particularly important for consumers with weak or weakened hand muscles and coordination. Thus, it also desirable to provide ethylene alpha-olefin molding compositions with improved heat resistance while maintaining a lower flexural modulus.

U.S. Pat. No. 4,429,079 to Shibata, et al., discloses an ethylene/alpha-olefin copolymer blend composition comprising a mixture of (A) 95-40 weight percent of a random copolymer of ethylene and an alpha-olefin having 5 to 10 carbon atoms which has a melt index of 0.1 to 20 g/10 min., a density of 0.910 to 0.940 g/cc, a crystallinity by X-rays of 40 to 70%, a melting point of 115° to 130° C., and an ethylene content of 94 to 99.5 mol %; and (B) 5 to 60% by weight of a random copolymer of ethylene and an alpha-olefin having 3 to 10 carbon atoms which has a melt index of 0.1 to 50 g/10 min., a density of 0.870 to 0.900 g/cc, a crystallinity by X-rays of 5 to 40%, a melting point of 40° to 100° C. and an ethylene content of 85 to 95 mol %. The (A) component polymer is said to be produced by a titanium catalyst system and the (B) component polymer is said to be produced by a vanadium catalyst. Both of these catalyst systems are known as Ziegler type catalysts which produce linear ethylene alpha-olefin polymers. That is, the polymer will have a linear molecular backbone without any long chain branching. Further, the (A) component polymer will also have a heterogeneously branched short chain distribution, while the (B) component polymer will have a homogeneously branched short chain distribution. The film fabricated from the Shibata et al. composition allegedly has good low-temperature heat sealability, heat seal strength, pin hole resistance, transparency and impact strength, making such film suitable for premium packaging applications. However, Shibata et al. do not disclose films with high ultimate hot tack strengths (i.e., values $\geq 2.56$ N/cm) and analysis of the data disclosed in the Examples provided by Shibata et al. reveals the properties of such film, particularly heat sealability, are additive and vary linearly with respect to the densities of blended component polymers.

U.S. Pat. No. 4,981,760 to Naito et al. discloses a polyethylene mixture having a density of from 0.900 to 0.930 g/cc and melt flow rate of from 0.1 to 100 g/10 in., which comprises (I) from 60 to 99 parts by weight of an ethylene-$\alpha$-olefin random copolymer comprising ethylene and an $\alpha$-olefin having from 4 to 10 carbon atoms, the copolymer having an $\alpha$-olefin content of from 2.0 to 10 mol % and a density of from 0.895 to 0.915 g/cc, the programmed-temperature thermogram of said copolymer as determined with a differential scanning calorimeter after being completely melted and then gradually cooled showing an endothermic peak in a range of from 75° to 100° C., with the ratio of an endotherm at said peak to the total endotherm being at least 0.8, and (II) from 1 to 40 parts by weight of high-density polyethylene having a density of at least 0.945 g/cc, the programmed-temperature thermogram of said high-density polyethylene as determined with a differential scanning calorimeter after being completely melted and allowed to cool showning an endothermic peak at 125° C., or higher, wherein the sum of (I) and (II) amounts to 100 parts by weight. The component polymer (I) is said to be manufactured using a vanadium catalyst and the film allegedly has improved heat sealability and hot tack. Naito et al. do not disclose that the mixture is useful for fabricating molded articles, and in particular, do not disclose that the mixture has high heat resistivity while simultaneously having good flexibility. Nor do Naito et al. disclose fabricated film comprising a component polymer (II) with a density less than 0.945 g/cc. Moreover, where Naito et al. do describe a film having a lower heat seal or hot tack initiation temperature, such film is only obtained when the lower density component polymer (I) concentration is high (i.e., $\geq 85$ parts) which is conventionally expected to result in lower Vicat softening points and reduced heat resistivity.

U.S. Pat. No. 5,206,075 to Hodgson et al. discloses a multilayer heat sealable film comprising a base layer and a heat sealable layer superimposed on one or both sides of the base layer. As the base layer, Hodgson discloses a blend of: (a) an olefin polymer having a density greater than 0.915 g/cc; and (b) a copolymer of ethylene and a $C_3$–$C_{20}$ alpha-monoolefin, with the copolymer (b) having a density of from about 0.88 to about 0.915 g/cc, a melt index of from about 0.5 to about 7.5 dg/min, a molecular weight distribution of no greater than about 3.5, and a composition distribution breadth index greater than about 70 percent. As the heat sealable layer, Hodgson discloses a layer comprising a copolymer as defined in (b) with respect to the base layer. Hodgson does not disclose the use of a blend, such as that employed in the base layer (a), as a suitable sealing layer and the preferred olefin polymer for component (a) of the base layer is a copolymer of propylene with about 1–10 mole percent ethylene.

The compositions disclosed by Shibata et al., Naito et al. and Hodgson et al. are disadvantageous in that they are not optimally designed for premium food packaging and storage container applications. In particular, there is a need for polymer compositions characterized by a Vicat softening point which is greater than the heat seal initiation temperature and/or hot tack initiation temperature of a thin film (i.e., a film having a thickness in the range of about 0.25 to about 3 mils (0.006 to about 0.076 mm)) fabricated from the resin, to allow higher packaging lines speeds without sacrificing the heat resistivity required for such applications as, for example, cook-in and hot fill packaging. There is also a need for polymer compositions which have low levels of n-hexane extractives, i.e., less than 15 weight percent, preferably less than 10 weight percent, more preferably less than 6 weight percent, most preferably less than 3 weight percent, as such compositions would be useful in direct food contact applications. Those in industry would further find great advantage in polymer compositions which have the above properties, as well as a controllably high modulus (indicating good dimensional stability and enabling high line speeds in vertical form, fill and seal applications) and high dart impact, tear resistance, and puncture resistance (leading to strong films and coatings, particularly useful in packaging articles containing sharp objects, such as bones found in primal and subprimal cuts of meat). There is also a need for polymer compositions that show a controllably low modulus and high heat resistance as molded articles as such, for instance, easy open freezer-to-microwave food container lids.

SUMMARY OF THE INVENTION

Accordingly, the subject invention provides a polymer mixture comprising:

(A) from 15 to 60 weight percent, based on the total weight of the mixture, of at least one first ethylene polymer which is a substantially linear ethylene polymer having a density in the range of 0.850 to 0.920 g/cc, wherein the substantially linear ethylene polymer is further characterized as having i. a melt flow ratio, $I_{10}/I_2 \geq 5.63$,
ii. a molecular weight distribution, $M_w/M_n$, as determined by gel permeation chromatography and defined by the equation: $(M_w/M_n) \leq (I_{10}/I_2) - 4.63$,
iii. a gas extrusion rheology such that the critical shear rate at onset of surface melt fracture for the substantially linear ethylene polymer is at least 50 percent greater than the critical shear rate at the onset of surface melt fracture for a linear ethylene polymer, wherein the substantially linear ethylene polymer and the linear ethylene polymer comprise the same comonomer or comonomers, the linear ethylene polymer has an $I_2$, $M_w/M_n$ and density within ten percent of the substantially linear ethylene polymer and wherein the respective critical shear rates of the substantially linear ethylene polymer and the linear ethylene polymer are measured at the same melt temperature using a gas extrusion rheometer, and
iv. a single differential scanning calorimetry, DSC, melting peak between −30° and 150° C.; and
(B) from 40 to 85 weight percent, based on the total weight of the mixture, of at least one second ethylene polymer which is a homogeneously branched, heterogeneously branched linear, or non-short chain branched linear ethylene polymer having a density in the range of 0.890 to 0.965 g/cc;

wherein the polymer mixture is characterized as having a density of from 0.890 to 0.930 g/cc, a differential between the densities of the first ethylene polymer and the second ethylene polymer of at least 0.015 g/cc, and a percent residual crystallinity, PRC, as defined by the equation:

$$PRC \geq 5.0195 \times 10^4(\rho) - 2.7062 \times 10^4(\rho)^2 - 2.3246 \times 10^4,$$

where $\rho$ is the density of the polymer mixture in grams/cubic centimeters.

The subject invention further provides a polymer mixture comprising:
(A) from 15 to 60 weight percent, based on the total weight of the mixture, of at least one first ethylene polymer which is a substantially linear ethylene polymer having a density in the range of 0.850 to 0.920 g/cc, wherein the substantially linear ethylene polymer is further characterized as having
i. a melt flow ratio, $I_{10}/I_2 \geq 5.63$,
ii. a molecular weight distribution, $M_w/M_n$, as determined by gel permeation chromatography and defined by the equation: $(M_w/M_n) \leq (I_{10}/I_2) - 4.63$,
iii. a gas extrusion rheology such that the critical shear rate at onset of surface melt fracture for the substantially linear ethylene polymer is at least 50 percent greater than the critical shear rate at the onset of surface melt fracture for a linear ethylene polymer, wherein the substantially linear ethylene polymer and the linear ethylene polymer comprise the same comonomer or comonomers, the linear ethylene polymer has an $I_2$, $M_w/M_n$ and density within ten percent of the substantially linear ethylene polymer and wherein the respective critical shear rates of the substantially linear ethylene polymer and the linear ethylene polymer are measured at the same melt temperature using a gas extrusion rheometer, and
iv. a single differential scanning calorimetry, DSC, melting peak between −30° and 150° C.; and
(B) from 40 to 85 weight percent, based on the total weight of the mixture, of at least one second ethylene polymer which is a homogeneously branched, heterogeneously branched linear, or non-short chain branched linear ethylene polymer having a density between 0.890 and 0.942 g/cc;

wherein the polymer mixture is characterized as having a density of from 0.890 to 0.930 g/cc, and a differential between the densities of the first ethylene polymer and the second ethylene polymer of at least 0.015 g/cc, Vicat softening point of at least 75° C.; and wherein
(a) a 0.038 mm thick film sealant layer fabricated from the polymer mixture has a heat seal initiation temperature equal to or less than 100° C. and an ultimate hot tack strength equal to or greater than 2.56 N/cm, and
(b) the Vicat softening point of the polymer mixture is more than 6° C. higher than the heat seal initiation temperature of the film sealant layer.

The subject invention further provides a polymer mixture comprising:
(A) from 15 to 60 weight percent, based on the total weight of the mixture, of at least one first ethylene polymer which is a substantially linear ethylene polymer having a density in the range of 0.850 to 0.900 g/cc, wherein the substantially linear ethylene polymer is further characterized as having
i. a melt flow ratio, $I_{10}/I_2 \geq 5.63$,
ii. a molecular weight distribution, $M_w/M_n$, as defined by the equation: $(M_w/M_n) \leq (I_{10}/I_2) - 4.63$,
iii. a gas extrusion rheology such that the critical shear rate at onset of surface melt fracture for the substantially linear ethylene polymer is at least 50 percent greater than the critical shear rate at the onset of surface melt fracture for a linear ethylene polymner, wherein the substantially linear ethylene polymer and the linear ethylene polymer comprise the same comonomer or comonomers, the linear ethylene polymer has an $I_2$, $M_w/M_n$ and density within ten percent of the substantially linear ethylene polymer and wherein the respective critical shear rates of the substantially linear ethylene polymer and the linear ethylene polymer are measured at the same melt temperature using a gas extrusion rheometer,
iv. a single differential scanning calorimetry, DSC, melting peak between −30° and 150° C.; and
v. a n-hexane extractive level of substantially 100 weight percent based on the weight of the first ethylene polymer; and
(B) from 40 to 85 weight percent, based on the total weight of the mixture, of at least one second ethylene polymer which is a homogeneously branched, heterogeneously branched linear, or non-short chain branched linear ethylene polymer having a density in the range of 0.890 to 0.942 g/cc;

wherein the polymer mixture is characterized as having a density of from 0.890 to 0.930 g/cc, a differential between the densities of the first ethylene polymer and the second ethylene polymer of at least 0.015 g/cc and a compositional hexane-extractive level which is at least 30 percent lower than the expected extractive amount based on the total weight of the mixture.

The subject invention further provides any of the polymer mixtures as defined herein in the form of a fabricated film, film layer, coating or molded article for such uses as cook-in bags, pouches for flowable materials, barrier shrink films, injected molded lids and packaging film sealant layers.

These and other embodiments will be more fully described in the Detailed Description set forth below.

DEFINITIONS OF TERMS

Figure 1:
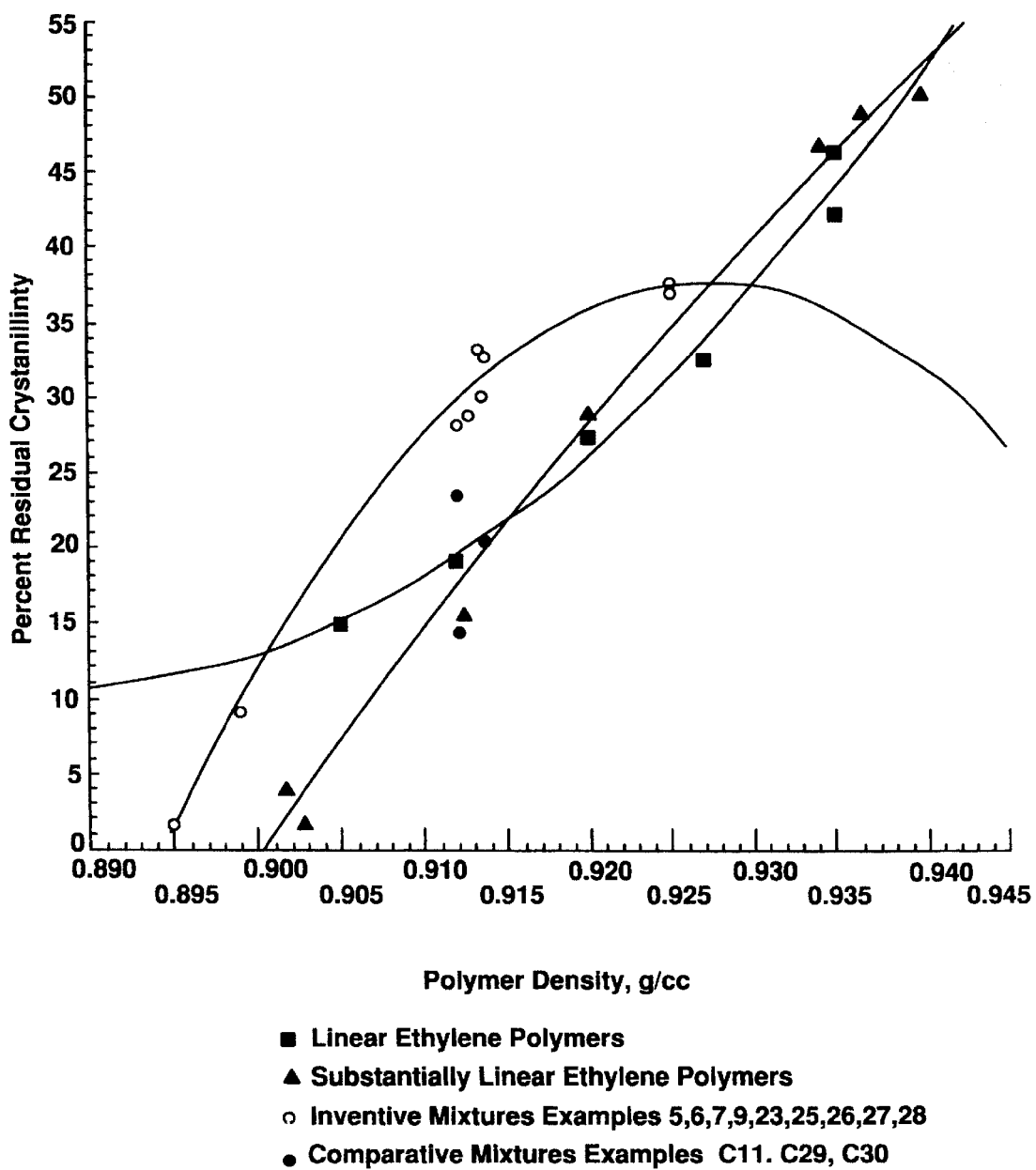
FIG. 1 is a plot of percent residual crystallinity as a function of density for Example and Comparative polymer mixtures and for single compositions of substantially linear ethylene polymers and heterogeneously branched linear ethylene polymers.

The term "polymer", as used herein, refers to a polymeric compound prepared by polymerizing monomers, whether of the same or a different type. The generic term polymer thus embraces the term "homopolymer", usually employed to refer to polymers prepared from only one type of monomer, and the term "interpolymer", as defined hereinafter.

The term "interpolymer", as used herein, refers to polymers prepared by the polymerization of at least two different types of monomers. The generic term "interpolymer" thus includes the term "copolymers", which is usually employed to refer to polymers prepared from two different monomers, as well as to polymers prepared from more than two different types of monomers.

The term "percent residual crystallinity", as used herein, refers to a first heat differential scanning calorimetry (DSC) determination of that amount of polymer material that melts at temperatures above 100° C. or 110° C. The test method used to determine the percent residual crystallinity of Examples is provided below.

The terms "controlled modulus" and "controllably low or high modulus", as used herein, refer to the ability to affect the modulus of a film, coating or molded article essentially independent of the heat resistivity of the polymer mixture or the heat seal initiation temperature of a sealant layer made from the polymer mixture by specifying ("controlling") the final density of the mixture.

The term "expected extractive amount", as used herein, refers to the additive weight percent of n-hexane extractives expected based on the weight fraction calculation for the individual n-hexane extractive levels contributed by the first and second ethylene polymers of a polymer mixture. As an example of the calculation, where a polymer mixture comprises (I) 30 weight percent of a first ethylene polymer which has a n-hexane extractive level of 50 weight percent, and (II) 70 weight percent of a second ethylene polymer which has a n-hexane extractive level of 10 weight percent, the polymer mixture will have an expected extractive amount of 22 weight percent where 15 weight percent would be contributed by the first ethylene polymer and 7 weight percent would be contributed by the second ethylene polymer.

The term "compositional hexane extractive level", as used herein, refers to the total weight percent of n-hexane extracted from an Example in accordance with the test method set forth in 21 CFR 177.1520 (d)(3)(ii).

The term "heat seal initiation temperature", as used herein, refers to the minimum temperature at which a 0.038 mm thick film sealant layer of a nylon/adhesive/sealant coextruded film structure measures a heat seal strength of at least 0.4 kg/cm when folded over and sealed to itself. The test method used to determine the heat seal initiation temperature of Examples, including the description of the coextruded film structure used, is provided herein below.

The term "ultimate hot tack strength", as used herein, refers to the maximum hot tack strength of a 0.038 mm thick film sealant layer in a nylon/adhesive/sealant coextruded structure. The test method used to determine the ultimate hot tack strength of Examples is provided herein below.

DETAILED DESCRIPTION OF THE INVENTION

The first ethylene polymer of the mixture of the invention, Component (A), is described as at least one substantially linear ethylene polymer having a density in the range of 0.850 to 0.920 g/cc. When used to fabricate the film and coating of the invention, the first ethylene polymer will have a density of greater than 0.865 g/cc, preferably greater than 0.875 g/cc, more preferably greater than 0.880 g/cc. When used to fabricate the film and coating of the invention, the first ethylene polymer will also have a density of less than 0.920 g/cc, preferably less than 0.910 g/cc, more preferably less than 0.900 g/cc. When used to fabricate the molded article of the invention, for purposes of, but not limited to, maximizing heat resistivity, the first ethylene polymer will have a density less than 0.890 g/cc, preferably less than 0.875 g/cc, more preferably less than 0.870 g/cc.

When the first ethylene polymer has a density of less than 0.900 g/cc, it will be further characterized as having a n-hexane extractive level of substantially 100 weight percent based on the weight of the first ethylene polymer. When the first ethylene polymer has a density less than 0.850 g/cc, it becomes tacky and difficult to handle in dry-blending operations. For the fabricated film and coating of the invention, when the first ethylene polymer has a density greater than 0.920 g/cc, heat seal and hot tack properties will be undesirably reduced. Also for the fabricated film and coating of the invention, when the density of the first ethylene polymer is less than 0.865 g/cc, the Vicat softening point will be undesirably low. For the molded article of the invention, when the first ethylene polymer has a density greater than 0.890 g/cc, undesirably, the heat resistivity of the mixture will be lower.

The second ethylene polymer of the polymer mixture of the invention, Component (B), is described as at least one homogeneously branched, heterogeneously branched linear, or non-short chain branched linear ethylene polymer having a density in the range of 0.890 to 0.965 g/cc. As such, suitable ethylene polymers are contemplated to include homogeneously branched linear ethylene interpolymers, heterogeneously branched linear ethylene interpolymers (both of the preceding include polymer classes known as linear low density polyethylene (LLDPE), medium density polyethylene (MDPE), copolymer high density polyethylene (HDPE) and ultra low or very low density polyethylene (ULDPE or VLDPE)), substantially linear ethylene polymers, homopolymer high density polyethylene (HDPE) (referred to herein as "non-short chain branched linear"), and combinations thereof.

When used to fabricate the film and coating of the invention, the second ethylene polymer will have a density greater than 0.890 g/cc, preferably greater than 0.900 g/cc, more preferably greater than 0.910 g/cc. When used to fabricate the film and coating of the invention, the second ethylene polymer will also have a density of less than 0.942 g/cc, preferably less than 0.940 g/cc, more preferably less than 0.938 g/cc. At densities greater than 0.942 g/cc, the differential between the Vicat softening point of the mixture (which is considered herein to be the same for a film fabricated from the mixture) and the heat seal initiation temperature of a 0.038 mm thick coextruded sealant layer is undesirably low (i.e., $\leq 6°$ C.). When the density of the second ethylene polymer is less than 0.890 g/cc, the compositional hexane extractive level of the mixture is undesirably high.

When used to fabricate the molded article of the invention, the second ethylene polymer will have a density of at least 0.930 g/cc, preferably of at least 0.950 g/cc, more preferably of at least 0.960 g/cc.

For direct food contact applications, preferably the second ethylene polymer will be further characterized as having a n-hexane extractive level of no more than 10 weight percent, preferably no more than 6 weight percent based on the weight of the second ethylene polymer.

The terms "homogeneous" and "homogeneously branched" are used in the conventional sense in reference to an ethylene polymer in which the comonomer is randomly distributed within a given polymer molecule and wherein substantially all of the polymer molecules have the same ethylene to comonomer molar ratio. Homogeneously branched polymers are characterized by a short chain branching distribution index (SCBDI) greater than or equal to 30 percent, preferably greater than or equal to 50 percent, more preferably greater than or equal to 90 percent. The SCBDI is defined as the weight percent of the polymer molecules having a comonomer content within 50 percent of the median total molar comonomer content. The SCBDI of polyolefins can be determined by well-known temperature rising elution fractionation techniques, such as those described by Wild et al., *Journal of Polymer Science, Poly. Phys. Ed.*, Vol. 20, p. 441 (1982); L. D. Cady, "The Role of Comonomer Type and Distribution in LLDPE Product Performance," SPE Regional Technical Conference, Quaker Square Hilton, Akron, Ohio, Oct. 1–2, pp. 107–119 (1985); or U.S. Pat. No. 4,798,081, the disclosures of all which are incorporated herein by reference.

The term "substantially linear" means that, in addition to the short chain branches attributable to homogeneous comonomer incorporation, the ethylene polymer is further characterized as having long chain branches in that the polymer backbone is substituted with an average of 0.01 to 3 long chain branch/1000 carbons. Preferred substantially linear polymers for use in the invention are substituted with from 0.01 long chain branch/1000 carbons to 1 long chain branch/1000 carbons, and more preferably from 0.05 long chain branch/1000 carbons to 1 long chain branches/1000 carbons.

Long chain branching is defined herein as a chain length of at least 6 carbons, above which the length cannot be distinguished using $^{13}C$ nuclear magnetic resonance spectroscopy. The long chain branch can be as long as about the same length as the length of the polymer backbone to which it is attached.

The presence of long chain branching can be determined in ethylene homopolymers by using $^{13}C$ nuclear magnetic resonance (NMR) spectroscopy and is quantified using the method described by Randall (*Rev. Macromol. Chem. Phys.*, C29, V. 2&3, p. 285–297), the disclosure of which is incorporated herein by reference.

As a practical matter, current $^{13}C$ nuclear magnetic resonance spectroscopy cannot determine the length of a long chain branch in excess of six carbon atoms. However, there are other known techniques useful for determining the presence of long chain branches in ethylene polymers, including ethylene/1-octene interpolymers. Two such methods are gel permeation chromatography coupled with a low angle laser light scattering detector (GPC-LALLS) and gel permeation chromatography coupled with a differential viscometer detector (GPC-DV). The use of these techniques for long chain branch detection and the underlying theories have been well documented in the literature. See, e.g., Zimm, G. H. and Stockmayer, W. H., J. Chem. Phys., 17,1301 (1949) and Rudin, A., *Modern Methods of Polymer Characterization*, John Wiley & Sons, New York (1991) pp. 103–112, both of which are incorporated by reference.

A. Willem deGroot and P. Steve Chum, both of The Dow Chemical Company, at the Oct. 4, 1994 conference of the Federation of Analytical Chemistry and Spectroscopy Society (FACSS) in St. Louis, MO., presented data demonstrating that GPC-DV is a useful technique for quantifying the presence of long chain branches in substantially linear ethylene interpolymers. In particular, deGroot and Chum found that the level of long chain branches in substantially linear ethylene homopolymer samples measured using the Zimm-Stockmayer equation correlated well with the level of long chain branches measured using $^{13}C$ NMR.

Further, deGroot and Chum found that the presence of octene does not change the hydrodynamic volume of the polyethylene samples in solution and, as such, one can account for the molecular weight increase attributable to octene short chain branches by knowing the mole percent octene in the sample. By deconvoluting the contribution to molecular weight increase attributable to 1-octene short chain branches, deGroot and Chum showed that GPC-DV may be used to quantify the level of long chain branches in substantially linear ethylene/octene copolymers.

deGroot and Chum also showed that a plot of Log($I_2$, Melt Index) as a function of Log(GPC Weight Average Molecular Weight) as determined by GPC-DV illustrates that the long chain branching aspects (but not the extent of long branching) of substantially linear ethylene polymers are comparable to that of high pressure, highly branched low density polyethylene (LDPE) and are clearly distinct from ethylene polymers produced using Ziegler-type catalysts such as titanium complexes and ordinary homogeneous catalysts such as hafnium and vanadium complexes.

For ethylene/alpha-olefin interpolymers, the long chain branch is longer than the short chain branch that results fromn the incorporation of the alpha-olefin(s) into the polymer backbone. The empirical effect of the presence of long chain branching in the substantial linear ethylene/alpha-olefin interpolymers used in the invention is manifested as enhanced rheological properties which are quantified and expressed herein in terms of gas extrusion rheometry (GER) results and/or melt flow, $I_{10}/I_2$, increases.

In contrast to the term "substantially linear", the term "linear" means that the polymer lacks measurable or demonstrable long chain branches, i.e., the polymer is substituted with an average of less than 0.01 long branch/1000 carbons.

Substantially linear ethylene interpolymers are further characterized as having (a) a melt flow ratio, $I_{10}/I_2 \geq 5.63$, (b) a molecular weight distribution, $M_w/M_n$ as determined by gel permeation chromatography and defined by the equation: $(M_w/M_n) \leq (I_{10}/I_2)-4.63$, (c) a critical shear stress at the onset of gross melt fracture, as determined by gas extrusion rheometry, of greater than $4 \times 10^6$ dynes/cm$^2$, or a gas extrusion rheology such that the critical shear rate at onset of surface melt fracture for the substantially linear ethylene polymer is at least 50 percent greater than the critical shear rate at the onset of surface melt fracture for a linear ethylene polymer, wherein the substantially linear ethylene polymer and the linear ethylene polymer comprise the same comonomer or comonomers, the linear ethylene polymer has an $I_2$, $M_w/M_n$ and density within ten percent of the substantially linear ethylene polymer and wherein the respective critical shear rates of the substantially linear ethylene polymer and the linear ethylene polymer are measured at the same melt temperature using a gas extrusion rheometer, and (d) a single differential scanning calorimetry, DSC, melting peak between $-30°$ and $150°$ C.

Determination of the critical shear rate and critical shear stress in regards to melt fracture as well as other rheology properties such as "rheological processing index" (PI), is performed using a gas extrusion rheometer (GER). The gas extrusion rheometer is described by M. Shida, R. N. Shroff and L. V. Cancio in *Polymer Engineering Science*, Vol. 17, No. 11, p. 770 (1977), and in "Rheometers for Molten Plastics" by John Dealy, published by Van Nostrand Reinhold Co. (1982) on pp. 97–99, both of which are incorporated by reference herein in their entirety. GCR experiments are performed at a temperature of $190°$ C., at nitrogen pressures between 250 to 5500 psig using a 0.0754 mm diameter, 20:1 L/D die with an entrance angle of $180°$. For the substantially linear ethylene polymers described herein, the PI is the apparent viscosity (in kpoise) of a material measured by GER at an apparent shear stress of $2.15 \times 10^6$ dyne/cm$^2$. The substantially linear ethylene polymer for use in the invention includes ethylene interpolymers and homopolymers and have a PI in the range of 0.01 kpoise to 50 kpoise, preferably 15 kpoise or less. The substantially linear ethylene polymers used herein have a PI less than or equal to 70 percent of the PI of a linear ethylene polymer (either a Ziegler polymerized polymer or a linear uniformly branched polymer as described by Elston in U.S. Pat. No. 3,645,992) having an $I_2$, $M_w/M_n$ and density, each within ten percent of the substantially linear ethylene poylmers.

The rheological behavior of substantially linear ethylene polymers can also be characterized the Dow Rheology Index (DRI), which expresses a polymer's "normalized relaxation time as the result of long chain branching." (See, S. Lai and G. W. Knight *ANTEC '93 Proceedings*, INSITE™ Technology Polyolefins (ITP)—New Rules in the Structure/Rheology Relationship of Ethylene α-Olefin Copolymers, New Orleans, La., May 1993, the disclosure of which is incorporated herein by reference). DRI values range from 0 for polymers which do not have any measurable long chain branching (e.g., Tafmer™ products available from Mitsui Petrochemical Industries and Exact™ products available from Exxon Chemical Company) to about 15 and is independent of melt index. In general, for low to medium pressure ethylene polymers (particularly at lower densities) DRI provides improved correlations to melt elasticity and high shear flowability relative to correlations of the same attempted with melt flow ratios. For the substantially linear ethylene polymers useful in this invention, DRI is preferably at least 0.1, and especially at least 0.5, and most especially at least 0.8. DRI can be calculated from the equation:

$$DRI = (365287 * \tau_0^{1.00649} / \eta_0 - 1)/10$$

where $\tau_0$ is the characteristic relaxation time of the material and $\eta_0$ is the zero shear viscosity of the material. Both $\tau_0$ and $\eta_0$ are the "best fit" values to the Cross equation, i.e., $$\eta/\eta_0 = 1/(1 = (\dot\gamma * \tau_0)^{1-n})$$

where n is the power law index of the material, and $\eta$ and $\gamma$ are the measured viscosity and shear rate, respectively. Baseline determination of viscosity and shear rate data are obtained using a Rheometric Mechanical Spectrometer (IRMS-800) under dynamic sweep mode from 0.1 to 100 radians/second at $160°$ C. and a Gas Extrusion Rheometer (GER) at extrusion pressures from 1,000 psi to 5,000 psi (6.89 to 34.5 MPa), which corresponds to shear stress from 0.086 to 0.43 MPa, using a 0.0754 mm diameter, 20:1 L/D die at $190°$ C. Specific material determinations can be performed from $140°$ to $190°$ C. as required to accommodate melt index variations.

An apparent shear stress versus apparent shear rate plot is used to identify the melt fracture phenomena and quantify the critical shear rate and critical shear stress of ethylene polymers. According to Iaamamurthy in the Tournal of Rheology, 30(2), 337–357, 1986, the disclosure of which is incorporated herein by reference, above a certain critical flow rate, the observed extrudate irregularities may be broadly classified into two main types: surface melt fracture and gross melt fracture.

Surface melt fracture occurs under apparently steady flow conditions and ranges in detail from loss of specular film gloss to the more severe form of "sharkskin." Herein, as determined using the above-described GEIR, the onset of surface melt fracture (OSMF) is characterized at the beginning of losing extrudate gloss at which the surface roughness of the extrudate can only be detected by 40× magnification. The critical shear rate at the onset of surface melt fracture for the substantially linear ethylene interpolymers and homopolymers is at least 50 percent greater than the critical shear rate at the onset of surface melt fracture of a linear ethylene polymer having essentially the same $I_2$ and $M_w/M_n$.

Gross melt fracture occurs at unsteady extrusion flow conditions and ranges in detail from regular (alternating rough and smooth, helical, etc.) to random distortions. For commercial acceptability to maximize the performance properties of films, coatings and moldings, surface defects should be minimal, if not absent. The critical shear stress at the onset of gross melt fracture for the substantially linear ethylene polymers, especially those having a density >0.910 g/cc, used in the invention is greater than $4 \times 10^6$ dynes/cm$^2$. The critical shear rate at the onset of surface melt fracture (OSMF) and the onset of gross melt fracture (OGMF) will be used herein based on the changes of surface roughness and configurations of the extrudates extruded by a GER. Preferably, the substantially linear ethylene polymer will be characterized by its critical shear rate when used as the first ethylene polymer of the invention and by its critical shear stress when used as the second ethylene polymer of the invention.

The substantially linear ethylene polymers used in the invention are also characterized by a single DSC melting peak. The single melting peak is determined using a differential scanning calorimeter standardized with indium and deionized water. The method involves 5–7 mg sample sizes, a "first heat" to about 140° C. which is held for 4 minutes, a cool down at 10°/min. to −30° C. which is held for 3 minutes, and heat up at 10° C./min. to 140° C. for the "second heat". The single melting peak is taken from the "second heat" heat flow vs. temperature curve. Total heat of fusion of the polymer is calculated from the area under the curve.

For polymers having a density of 0.875 g/cc to 0.910 g/cc, the single melting peak may show, depending on equipment sensitivity, a "shoulder" or a "hump" on the low melting side that constitutes less than 12 percent, typically, less than 9 percent, and more typically less than 6 percent of the total heat of fusion of the polymer. Such an artifact is observable for other homogeneously branched polymers such as Exact™ resins and is discerned on the basis of the slope of the single melting peak varying monotonically through the melting region of the artifact. Such an artifact occurs within 34° C., typically within 27° C., and more typically within 20° C. of the melting point of the single melting peak. The heat of fusion attributable to an artifact can separately determined by specific integration of its associated area under the heat flow vs. temperature curve.

The substantially linear ethylene polymers are analyzed by gel permeation chromatography (GPC) on a Waters 150 high temperature chromatographic unit equipped with differential refractometer and three columns of mixed porosity. The columns are supplied by Polymer Laboratories and are commonly packed with pore sizes of $10^3$, $10^4$, $10^5$ and $10^6$Å. The solvent is 1,2,4-trichlorobenzene, from which 0.3 percent by weight solutions of the samples are prepared for injection. The flow rate is 1.0 milliliters/minute, unit operating temperature is 140° C. and the injection size is 100 microliters.

The molecular weight determination with respect to the polymer backbone is deduced by using narrow molecular weight distribution polystyrene standards (from Polymer laboratories) in conjunction with their elution volumes. The equivalent polyethylene molecular weights are determined by using appropriate Mark-Houwink coefficients for polyethylene and polystyrene (as described by Williams and Ward in *Journal of Polymer Science*, Polymer Letters, Vol. 6, p. 621, 1968) to derive the following equation:

$$^M\text{polyethlylene}=a*(^M\text{polystyrene})^b.$$

In this equation, a=0.4316 and b=1.0. Weight average molecular weight, $M_w$, is calculated in the usual manner according to the following formula: $M_w=\Sigma w_i \times M_i$, where $w_i$ and $M_i$ are the weight fraction and molecular weight, respectively, of the $i_{th}$ fraction eluting from the GPC column.

Substantially linear ethylene polymers are known to have excellent processability, despite having a relatively narrow molecular weight distribution (i.e., the $M_w/M_n$ ratio is typically less than 3.5, preferably less than 2.5, and more preferably less than 2). Moreover, unlike homogeneously and heterogeneously branched linear ethylene polymers, the melt flow ratio ($I_{10}/I_2$) of substantially linear ethylene polymers can be varied essentially independently of the molecular weight distribution, $M_w/M_n$. Accordingly, the first ethylene polymer, Component (A), of the inventive polymer mixtures is a substantially linear ethylene polymer. In addition to having enhanced rheological properties, at least one substantially linear ethylene polymer is used in the invention as the first ethylene polymer for purposes of providing, but not limited to, high ultimate hot tack strength, i.e., $\geq 6.5$ N/inch (2.56 N/cm).

Substantially linear ethylene polymers are homogeneously branched ethylene polymers and are disclosed in U.S. Pat. No. 5,272,236 and U.S. Pat. No. 5,272,272, the disclosures of which are incorporated herein by reference. Homogeneously branched substantially linear ethylene polymers are available from The Dow Chemical Company as Affinity™ polyolefin plastomers, and as Engage™ polyolefin elastomers. Homogeneously branched substantially linear ethylene polymers can be prepared via the solution, slurry, or gas phase polymerization of ethylene and one or more optional alpha-olefin comonomers in the presence of a constrained geometry catalyst, such as is disclosed in European Patent Application 416,815-A, incorporated herein by reference. Preferably, a solution polymerization process is used to manufacture the substantially linear ethylene interpolymer used in the present invention.

Homogeneously branched linear ethylene polymers have long been commercially available. As exemplified in U.S. Pat. No. 3,645,992 to Elston, homogeneously branched linear ethylene polymers can be prepared in conventional polymerization processes using Ziegler-type catalysts such as, for example, zirconium and vanadium catalyst systems. U.S. Pat. No. 4,937,299 to Ewen et al. and U.S. Pat. No. 5,218,071 to Tsutsui et al. disclose the use of metarocene catalysts, such as catalyst systems based on hafnium, for the preparation of homogeneously branched linear ethylene polymers. Homogeneously branched linear ethylene polymers are typically characterized as having a molecular weight distribution, $M_w/M_n$, of about 2. Commercial examples of homogeneously branched linear ethylene polymers include those sold by Mitsui Petrochemical Industries as Tafmer™ resins and by Exxon Chemical Company as Exact™ resins.

The terms "heterogeneous" and "heterogeneously branched" mean that the ethylene polymer is characterized as a mixture of interpolymer molecules having various ethylene to comonomer molar ratios. Heterogeneously branched ethylene polymers are characterized as having a short chain branching distribution index (SCBDI) less than about 30 percent. Heterogeneously branched linear ethylene polymers are available from The Dow Chemical Company as Dowlex™ linear low density polyethylene and as Attane™ ultra-low density polyethylene resins. Heterogeneously branched linear ethylene polymers can be prepared via the solution, slurry or gas phase polymerization of ethylene and one or more optional alpha-olefin comonomers in the presence of a Ziegler Natta catalyst, by processes such as are disclosed in U.S. Pat. No. 4,076,698 to Anderson et al., incorporated herein by reference. Preferably, heterogeneously branched ethylene polymers are typically characterized as having molecular weight distributions, $M_w/M_n$, in the range of from 3.5 to 4.1.

The ethylene polymers useful as component (A) or (B) of the mixtures of the invention can independently be interpolymers of ethylene and at least one aipha-olefin. Suitable alpha-olefins are represented by the following formula:

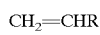

where R is a hydrocarbyl radical. The comonomer which forms a part of component (A) may be the same as or different from the comonomer which forms a part of component (B) of the inventive mixture.

Further, R may be a hydrocarbyl radical having from one to twenty carbon atoms. Suitable alpha-olefins for use as comonomers in a solution, gas phase or slurry polymerization process or combinations thereof include 1-propylene, 1-butene, 1-isobutylene, 1-pentene, 1-hexene, 4-methyl-1-pentene, 1-heptene and 1-octene, as well as other monomer types such as styrene, halo- or alkyl-substituted styrenes, tetrafluoro-ethylene, vinyl benzocyclobutane, 1,4-hexadiene, 1,7-octadiene, and cycloalkenes, e.g., cyclopentene, cyclohexene and cyclooctene. Preferably, the alpha-olefin will be 1-butene, 1-pentene, 4-methyl-1-pentene, 1-hexene, 1-heptene, 1-octene, or mixtures thereof. More preferably, the alpha-olefin will be 1-hexene, 1-heptene, 1-octene, or mixtures thereof, as films fabricated with the resultant interpolymers will have especially improved puncture resistance, dart impact, and tear strength properties where such higher alpha-olefins are utilized as comonomers. However, most preferably, the alpha-olefin will be 1-octene.

The polymer mixture of the invention will have a density of from 0.890 to 0.930 g/cc as measured in accordance with ASTM D792. Further, the polymer mixture of the invention will have a density of at least 0.890 g/cc, preferably of at least 0.903 g/cc, more preferably of at least 0.909 g/cc. The polymer mixture of the invention will have a density of less than 0.930 g/cc, preferably less than 0.928 g/cc, more preferably of less than 0.922 g/cc.

For the inventive polymer mixture, the difference between the densities of the first and second polymer is generally at least 0.015 g/cc, preferably, at least 0.025 g/cc, more preferably at least 0.045 g/cc. For purposes of the molded article of the invention, the density differential can be even higher such as at least 0.065 g/cc, especially at least 0.085 g/cc. In general, the higher the density differential, the more improved the heat resistance will be relative to a heterogeneously branched linear ethylene polymer having essentially the same density and, as such, higher density differentials are particularly preferred for the molded articles of the invention.

The polymer mixture comprises from 15 to 60 weight percent, preferably from 15 to 50, more preferably from 20 to 45 weight percent of the first ethylene polymer (A) based on the total weight of the mixture and from 40 to 85 weight percent, preferably from 50 to 85, more preferably from 55 to 80 weight percent at the second ethylene polymer (B) based on the total weight of the mixture.

Component (A) and component (B) will be independently characterized by an $I_2$ melt index of from 0.01 to 100 g/10 min. In preferred embodiments, components (A) and (B) will be independently characterized by an $I_2$ melt index of from 0.1 to 50 g/10 minutes. By "independently characterized" it is meant that the $I_2$ melt index of component (A) need not be the same as the $I_2$ melt index of component (B).

The $I_2$ of the polymer mixture of the invention will be from 0.01 to 100 g/10 min., preferably from 0.1 to 75 g/10 min., more preferably from 0.5 to 50 g/10 min. Generally, for polymer mixtures useful in preparing the fabricated film of the invention, the $I_2$ will be less than 30 g/10 min., preferably less than 20 g/10 min., more preferably less than 15 g/10 min. Generally, for polymer mixtures useful in preparing the molded article of the invention, the $I_2$ of the polymer mixture will be greater than 10 g/10 min., preferably greater than 15 g/10 min., more preferably greater than 20 g/10 min.

The polymer mixture of the invention is generally characterized as having a percent residual crystallinity, PRC, as defined by the equation:

$$PRC \geq 5.0195 \times 10^4 (\rho) - 2.7062 \times 10^4 (\rho)^2 - 2.3246 \times 10^4,$$

preferably $$PRC \geq 5.7929 \times 10^4 (\rho) - 3.1231 \times 10^4 (\rho)^2 - 2.6828 \times 10^4,$$

more preferably $$PRC \geq 6.4363 \times 10^4 (\rho) - 3.470 \times 10^4 (\rho)^2 - 2.9808 \times 10^4,$$

In the equations immediately above, $\rho$ is the density of the polymer mixture in grams/cubic centimeters.

One preferred polymer mixture of the invention will be characterized as having a percent residual crystallinity which is at least 17.5% higher, preferably at least 20% higher, more preferably at least 35% higher, most preferably at least 50% higher than the percent residual crystallinity of a single linear ethylene polymer, or alternately, of a linear ethylene polymer mixture (i.e., a polymer mixture wherein essentially all component polymers are "linear"), having essentially the same density.

A plot of percent residual crystallinity of the polymer mixture of the invention as a function of density (FIG. 1), will show a maximum percent residual crystallinity value for polymer mixtures characterized by a density in the range of 0.890 to 0.930 g/cc.

Where a polymer mixture of the invention is not defined by one of the above equations or the mixture does not have a percent residual crystallinity at least equal to or higher than the percent residual crystallinity a linear ethylene polymer (or linear ethylene polymer mixture) having essentially the same density, such inventive polymer mixture will be distinguished by its enhanced performance in the form of monolayer or coextruded film, or alternately, such mixture will comprise a first ethylene polymer which has a n-hexane extractive level of substantially 100 weight percent and the polymer mixture will be further characterized as having a compositional hexane extractive level of less than 30 percent, preferably less than 40 percent, more preferably less than 50 percent, especially less than 80 percent, most especially less than 90 percent lower than the expected extractive amount for the mixture based on the total weight of the mixture.

A preferred polymer mixture of the invention will be characterized as having a compositional hexane extractive level of less than 15 percent, preferably less than 10 percent, more preferably less than 6, most preferably less than 3 percent based on the total weight of the mixture.

Temperature rising elution fractionation (TREF) such as described by Wild et al. can be used to "fingerprint" or identify the novel mixtures of the invention.

Another preferred polymer mixture of the invention will be characterized by a Vicat softening point of at least 75° C., preferably at least 85° C., and more preferably at least 90° C.

In another embodiment, a preferred polymer mixture of the invention, when fabricated as a 1.5 mil (0.038 mm) thick sealant layer of a nylon/adhesive/sealant blown coextruded film, will be characterized by a heat seal initiation temperature of less than 100° C., preferably less than 90° C., more preferably less than 85° C., most preferably less than 80° C.

In another embodiment, a preferred polymer mixture of the invention will have a Vicat softening point more than 6° C. higher, preferably at least than 8° C. higher, more preferably at least 10° C. higher, especially at least 15° C. higher, most especially at least 20° C. higher than the heat seal initiation temperature of a 1.5 mil (0.038 mm) thick sealant layer (fabricated from the polymer mixture) of a nylon/adhesive/sealant blown coextruded film.

In another embodiment, a polymer mixture of the invention, when molded into an essentially flat part having a thickness of 125 mils (31.7 mm), will be characterized as having a microwave warp distortion of less than 0.75 cm, preferably less than 0.70 cm and most preferably less than or equal to 0.65 cm while maintaining a flexural modulus of less than 35,000 psi, preferably less than 30,000 psi, more preferably less than 25,000 psi (172.4 MPa).

A-preferred molded article of the invention will show a heat resistivity superior to a linear ethylene polymer having a density of 0.927 g/cc while simultaneously showing a controllably low flexural modulus, that is, having a flexural modulus lower than a linear ethylene polymer having a density less than 0.927 g/cc, preferably less than 0.920 g/cc, more preferably less than 0.912 g/cc.

Another embodiment of the present invention is a process for fabricating the polymer mixture of the invention into the form of a film, film layer, coating or molded article. The process can include a lamination and coextrusion technique or combinations thereof, or using the polymer mixture alone, and includes a blown film, cast film, extrusion coating, injection molding, blow molding, compression molding, rotomolding, or injection blow molding operation or combinations thereof.

The polymer mixture of the invention can be formed by any convenient method, including dry blending the individual components and subsequently melt mixing in a mixer or by mixing the components together directly in a mixer (e.g., a Banbury mixer, a Haake mixer, a Brabender internal mixer, or a single or twin screw extruder including a compounding extruder and a side-arm extruder employed directly down stream of a interpolymerization process.

The mixtures of the invention can further be formed in-situ via the interpolymerization of ethylene and the desired alpha-olefin using a constrained geometry catalyst in at least one reactor and a constrained geometry catalyst or a Ziegler-type catalyst in at least one other reactor. The reactors can be operated sequentially or in parallel. An exemplary in-situ interpolymerization process is disclosed in PCT patent application Ser. No. 94/01052, incorporated herein by reference.

The polymer mixture of the invention can further be formed by isolating component (A) from a heterogeneous ethylene polymer by fractionating the heterogeneous ethylene polymer into specific polymer fractions with each fraction having a narrow branching distribution, selecting the fractions appropriate to meet the limitations specified for component (A), and blending the selected fraction in the appropriate amounts with a component (B). This method is obviously not as economical as the in-Situ polymerization described above, but can nonetheless be used to obtain the polymer mixture of the invention.

Additives, such as antioxidants (e.g., hindered phenolics, such as Irganox™ 1010 or Irganox™ 1076 supplied by Ciba Geigy), phosphites (e.g., Irgafos™ 168 also supplied by Ciba Geigy), cling additives (e.g., PIB), Standostab PEPQ™ (supplied by Sandoz), pigments, colorants, fillers, and the like may also be included in the polymer mixture of the present invention or in films formed from the same. Although generally not required, films, coatings and moldings formed from the polymer mixture of the present invention may also contain additives to enhance antiblocking, mold release and coefficient of friction characteristics including, but not limited to, untreated and treated silicon dioxide, talc, calcium carbonate, and clay, as well as primary, secondary and substituted fatty acid amides, release agents, silicone coatings, etc. Still other additives, such as quaternary ammonium compounds alone or in combination with ethylene-acrylic acid (EAA) copolymers or other functional polymers, may also be added to enhance the antistatic characteristics of films, coatings and moldings formed from the polymer mixture of the invention and permit the use of these polymer mixtures in, for example, the heavy-duty packaging of electronically sensitive goods.

The polymer mixture of the invention may further include recycled and scrap materials and diluent polymers, to the extent that the desired performance properties are maintained. Exemplary diluent materials include, for example, elastomers, rubbers and anhydride modified polyethylenes (e.g., polybutylene and maleic anhydride grafted LLDPE and HDPE) as well as with high pressure polyethylenes such as, for example, low density polyethylene (LDPE), ethylene/acrylic acid (EAA) interpolymers, ethylene/vinyl acetate (EVA) interpolymers and ethylene/methacrylate (EMA) interpolymers, and combinations thereof.

The polymer mixture of the invention may find utility in a variety of applications, including but not limited to shrink film (including but not limited to barrier shrink film), packages formed via horizontal or vertical form/fill/seal machinery, cook-in packaged foods, injection molded containers (particularly food storage containers), etc.

Barrier shrink film refers to oriented films (typically biaxially oriented films) which are caused to shrink about the packaged article upon the application of heat. Barrier shrink films find utility in the packaging of primal and subprimal cuts of meat, ham, poultry, bacon, cheese, etc. A typical barrier-shrink film utilizing the polymer mixture of the invention may be a three to seven layer co-extruded structure, with a heat sealing food contact layer (such as the polymer mixture of the invention), an outer layer (such as heterogeneously branched linear low density or ultra-low density polyethylene), and a barrier layer (such as a vinylidene chloride polymer or copolymer) interposed between. Adhesion promoting tie layers (such as Primacor™ ethylene-acrylic acid (EAA) copolymers available from The Dow Chemical Company, and/or ethylene-vinyl acetate (EVA) copolymers, as well as additional structural layers (such as Affinity™ polyolefin plastomers, Engage™ polyolefin elastomers, both available from The Dow Chemical Company, ultra-low density polyethylene, or blends of any of these polymers with each other or with another polymer, such as EVA) may be optionally employed. Barrier shrink films so fabricated with the mixtures of the invention will preferably shrink at least 25 percent in both the machine and transverse directions. Film or film layers fabricated from the polymer mixture of the invention are particularly well-suited as sealant layers in multilayer food packaging structures such as barrier shrink film and aseptic packages.

Cook-in packaged foods are foods which are prepackaged and then cooked. The packaged and cooked foods go directly to the consumer, institution, or retailer for consumption or sale. A package for cook-in must be structurally capable of withstanding exposure to cook-in time and temperature conditions while containing a food product. Cook-in packaged foods are typically employed for the packaging of ham, turkey, vegetables, processed meats, etc.

Vertical form/fill/seal packages are typically utilized for the packaging of flowable materials, such as milk, wine, powders, etc. In a vertical form/fill/seal (VFFS) packaging process, a sheet of the plastic film structure is fed into a VFFS machine where the sheet is formed into a continuous tube by sealing the longitudinal edges of the film together by lapping the plastic film and sealing the film using an inside/outside seal or by fin sealing the plastic film using an inside/inside seal. Next, a sealing bar seals the tube transversely at one end to form the bottom of a pouch. The flowable material is then added to the formed pouch. The sealing bar then seals the top end of the pouch and either burns through the plastic film or a cutting device cuts the film, thus separating the formed completed pouch from the tube. The process of making a pouch with a VFFS machine is generally described in U.S. Pat. Nos. 4,503,102 and 4,521,437, the disclosures of which are incorporated herein by reference.

As stated above, in one embodiment, the polymer mixture of the invention will be characterized by a Vicat softening point of at least 75° C., more preferably of at least 85°, most preferably of at least 90° C. As further stated above, in one embodiment, the polymer mixture of the invention, when fabricated into a 1.5 mils (0.038 mm) blown coextruded film as a sealant layer having a thickness of, will further be characterized by a heat seal initiation temperature of less than 100° C., preferably less than 90° C., more preferably less than 85° C., most preferably less than 80° C.

As further stated above, in one embodiment, the polymer mixture of the invention will be characterized by a Vicat softening point which is more than 6° C., preferably equal to or more than 8° C., more preferably equal to or more than 10° C., especially equal to or more than 15° C., most especially equal to or more than 20° C. higher than the heat seal initiation temperature of a 1.5 mil (0.038 mm) thick sealant layer (fabricated from the inventive polymer mixture) of a nylon/adhesive/sealant blown coextruded film.

As also stated above, in one embodiment, an essentially flat molded part fabricated from the polymer mixture of the invention will be characterized by having less than 0.75 cm, preferably less than 0.70 cm, and more preferably less than 0.65 cm of microwave warp distortion when exposed to low frequency microwave radiation energy for 5 minutes and while showing a flexural modulus of less than 35,000 psi (241.3 MPa) prior to microwave exposure.

One particular embodiment of the polymer mixture of the invention, especially suitable as a food packaging resin, when fabricated into a blown monolayer film having a thickness of 2 mils (0.051 mm), will be characterized as having a controllable 2% secant modulus (MD) in the range of 5,000 psi (34 MPa) to 35,000 psi (241 MPa), especially in the range of 7,000 psi (48 MPa) to 25,000 psi (172 MPa).

Another particular embodiment of the polymer mixture of the invention, especially suitable as a food packaging resin, when fabricated into a blown monolayer film having a thickness of 2 mil (0.051 mm), will be characterized by an Elmendorf tear (MD) of at least 300 g, preferably at least 600 g, and more preferably at least 800 g.

Another particular embodiment of the polymer mixture of the invention, especially suitable as a food packaging resin, when fabricated into a blown monolayer film having a thickness of 2 mil (0.051 mm), will be characterized by a Dart Impact (Type B) of greater than 300 g, preferably greater than 450 g, more preferably greater than 500 g, and most preferably greater than 600 g.

Another particular embodiment of the polymer mixture of the invention, especially suitable as a food packaging resin, when fabricated into a blown monolayer film having a thickness of 2 mil (0.051 mm), will be characterized by a puncture resistance of greater than 150 ft-lb/in$^3$ (126 kg-cm/cc), preferably greater than 200 ft-lb/in$^3$ (168 kg-cm/cc), more preferably greater than 250 ft-lb/in$^3$ (210 kg-cm/cc), more preferably at least 275-ft lb/in$^3$ (231 kg-cm/cc), and most preferably at least 300 ft-lb/in$^3$ (252 kg-cm/cc).

Description of Test Methods

Densities are measured in accordance with ASTM D-792 and are reported as grams/cubic centimeter (g/cc). The measurements reported in the Examples below are determined after the polymer samples have been annealed for 24 hours at ambient conditions.

Melt index measurements are performed according to ASTM D-1238, Condition 190° C./2.16 kilogram (kg) and condition 190° C./5 kg which are known as $I_2$ and $I_5$, respectively. For purposes of this invention, in calculating certain values in the Examples, $I_5$ and $I_2$ values roughly relate to one another by a factor of about 5.1; for example, a 1.0 $I_2$ index melt is equivalent to a 5.1 $I_5$ melt index. Melt index is inversely proportional to the molecular weight of the polymer. Thus, the higher the molecular weight, the lower the melt index, although the relationship is not linear. Melt index is reported as g/10 minutes. Melt index determinations can also be performed with even higher weights, such as in accordance with ASTM D-1238, Condition 190° C./10 kg, which is known as $I_{10}$.

The term "melt flow ratio" as defined herein in the conventional sense as the ratio of a higher weight melt index determination to a lower weight melt index determination. For measured $I_{10}$ and $I_2$ melt index values, the melt flow ratio is conveniently designated as $I_{10}/I_2$.

The Elmendorf tear values of films prepared from the mixtures of the invention is measured in accordance with ASTM D1922 and is reported in grams. Elmendorf tear is measured both the machine direction (MD) and in the cross direction (CD). The term "tear strength" is used herein to represent the average between MD and CD Elmendorf tear values and, likewise, is reported in grams. The dart impact of films prepared from the mixtures of the invention is measured in accordance with ASTM D1709. Where indicated and according to the relationship of higher thicknesses yield increased performance values, Elmendorf tear and dart impact results are normalized to exactly 2 mils (0.051 mm) by proportionate increases or decreases based on actual measured (micrometer) film thickness. Such normalization calculations are only performed and reported where thickness variations are less than 10 percent, i.e., where the measured thickness is in the range of about 1.8–2.2 mils (0.46–0.56 mm).

Film puncture values are obtained using an Instron tensiometer equipped with a strain cell and an integrated digital display that provides force determinations. A single ply of a blown monolayer film having a thickness of 2 mils (0.051 mm) is mounted taut between the two halves of a circular holder constructed of aluminum and machined to couple the halves securely when they are joined together. The exposed film area when mounted in the holder is 4 inches (10.2 cm) in diameter. The holder is then affixed to the upper stationary jaw of the tensiometer. To the lower jaw of the tensiometer which is set to traverse upwardly, a hemispherical aluminum probe having a 12.5 mm diameter is affixed. The probe is aligned to traverse upwards through the center of the mounted film at a deformation rate of 250 mm/min. The force required to rupture the film is taken from the digital display and divided by the film thickness and the diameter of the probe to provide puncture resistance in kg-cm/cc.

Secant modulus is measured in accordance with ASTM D882 on 2 mil (0.051 mm) blown monolayer film fabricated from the Examples, the n-hexane extractive level is measured in accordance with 21 CFR 177.1520 (d)(3)(ii) on 4-mil (1-mm) compression molded film fabricated from the Examples, and the Vicat softening point is measured in accordance with ASTM D1525 on 2 mil (0.051 mm) blown monolayer film fabricated from the Examples.

Heat seal initiation temperature is defined as the minimum temperature for a 2 lb/in (0.4 kg/cm) seal strength. Heat seal testing is performed using a 3.5 mil (0.089 mm) thick coextruded film of the following structure: 1 mil (0.025 mm) Capron Xtraform™ 1590F Nylon 6/6, 6 copolymer available from Allied Chemical Company/1 mil (0.025 mm) Primacor™ 1410 ethylene-acrylic acid (EAA) copolymer available from The Dow Chemical Company/1.5 mil (0.038 mm) sealant layer of the polymer mixture of the Examples. The testing is done on a Topwave Hot Tack Tester using a 0.5 second dwell time with a 40 psi (0.28 MPa) seal bar pressure. The seals are made at 5° increments in the range of 60°–160° C. by folding the sealant layer over and sealing it to itself. The so-formed seals are pulled 24 hours after they are made using an Instron tensiometer at a 10 in/min. (51 cm/min.) crosshead rate.

Hot tack initiation temperature is defined as the minimum seal temperature required to develop a 4 Newton/in (1.6 N/cm) seal strength. Hot tack testing is also performed using above-described three-layer coextruded structure and a Topwave Hot Tack Tester set at a 0.5 second dwell, 0.2 second delay time, and 40 psi (0.28 MPa) seal bar pressure. Hot tack seals are made at 5° increments in the temperature range of 60°–160° C. by folding the sealant layer over and hot tack sealing it to itself. The peel rate applied to the so-formed hot tack seals is of 150 mm/sec. The tester pulls the seal immediately after the 0.2 second delay. Ultimate hot tack strength is taken as the maximum N/cm value in the 60°–160° C. temperature range for the Example.

Figure 6:
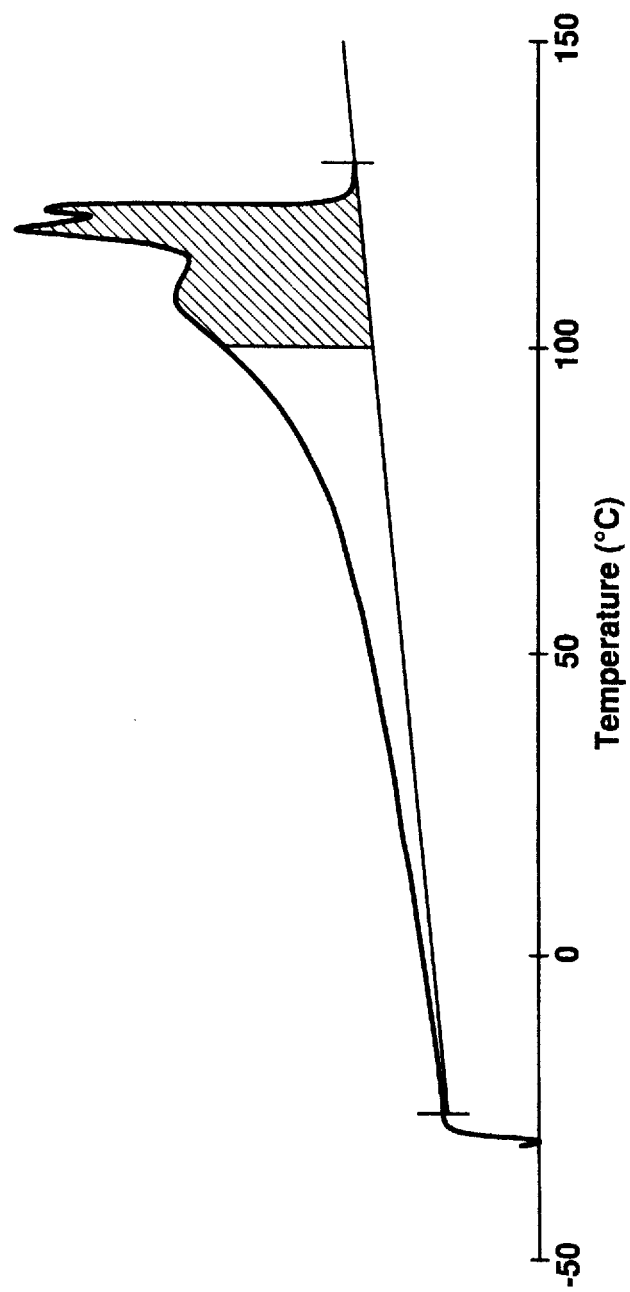
FIG. 6 is a graphical illustration of a differential scanning calorimetry (DSC) "first heat" melting curve which illustrates the portion of the curve above 100° C. that is actually quantified for 100° C. percent residual crystallinity determinations.

Residual crystallinity is determined using a Perkin-Elmer DSC 7. The determination involves quantifying the heat of fusion of that portion of an Example above 100° C. or 110° C. at first heat. The area under "first heat" melting curve is determined by computer integration using Perkin-Elmer PC Series Software Version 3.1. FIG. 6 graphically illustrates a "first heat" melting curve and the area under the curve above 100° C. actually integrated.

The ASTM test methods, as well as the test method promulgated by the Food and Drug Administration for hexane-extractive levels set forth in 21 CFR 177.1520 (d)(3)(ii), are incorporated herein by reference.

EXAMPLES

The following examples are provided for the purpose of explanation, rather than limitation.

Examples 1–3

Example 1 is prepared using an in-situ polymerization and mixture process, such as is disclosed in PCT patent application Ser. No. 94/01052, the disclosure of which is incorporated herein by reference. The particular production details are set forth as follows.

Constrained Geometry Catalyst Preparation

A known weight of the constrained-geometry organometallic complex $[((CH_3)_4C_5))\!\!-\!\!(CH_3)_2Si\!\!-\!\!N\!\!-\!\!(t\text{-}C_4H_9)]Ti(CH_3)_2$ is dissolved in Isopar™ E hydrocarbon (available from Exxon Chemical Company) to give a clear solution with a titanium (Ti) concentration of $9.6\times10^{-4}$M. A similar solution of the activator complex tris(perfluorophenyl) borane ($3.8\times10^{-3}$M) is also prepared. A known weight of methylalumoxane (available from Texas Alkyls as MMAO) is dissolved in n-heptane to give a solution with an MMAO concentration of $1.06\times10^{-2}$M. These solutions are independently pumped such that they are combined just prior to being fed into the first polymerization reactor and such that the constrained geometry catalyst, the activator complex, and the MMAO are in a molar ratio of 1:3.5:7.

Heterogeneous Catalyst Preparation

A heterogeneous Ziegler-type catalyst is prepared substantially according to the procedure of U.S. Pat. No. 4,612,300 (Example P), by sequentially adding to a volume of Isopar™ E hydrocarbon, a slurry of anhydrous magnesium chloride in Isopar™ E hydrocarbon, a solution of EtAlCl$_2$ in n-hexane, and a solution of Ti(O-iPr)$_4$ in Isopar™ E hydrocarbon, to yield a slurry containing a magnesium concentration of 0.166M and a ratio of Mg/Al/Ti of 40.0:12.5:3.0. An aliquot of this slurry and a dilute solution of Et$_3$Al (TEA) are independently pumped with the two streams being combined just prior to introduction into the second polymerization reactor to give an active catalyst with a final TEA:Ti molar ratio of 6.2:1.

Polymerization Process.

Ethylene is fed into a first reactor at a rate of 40 lb/hr (18.2 kg/hr). Prior to introduction into the first reactor, the ethylene is combined with a diluent mixture comprising Isopar™ E hydrocarbon (available from Exxon Chemical Company) and 1-octene. With respect to the first polymerization reactor, the 1-octene:ethylene ratio (constituting fresh and recycled monomer) is 0.28:1 (mole percent) and the diluent:ethylene feed ratio is 8.23:1 (weight percent). A homogeneous constrained geometry catalyst and cocatalyst such as prepared above is introduced into the first polymerization reactor. The catalyst, activator, and MMAO flow rates into the first polymerization reactor are $1.64\times10^{-5}$ lbs. Ti/hr ($7.4\times10^{-6}$ kg Ti/hr), $6.21\times10^{-4}$ lbs. activator/hr ($2.82\times10^{-4}$ kg activator/hr), and $6.57\times10^{-5}$ lbs. MMAO/hr ($3.0\times10^{-5}$ kg MMAO/hr), respectively. The polymerization is conducted at a reaction temperature in the range of 70°–160° C.

The reaction product of the first polymerization reactor is transferred to a second reactor. The ethylene concentration in the exit stream from the first polymerization reactor is less than four percent, indicating the presence of long chain branching as described in U.S. Pat. No. 5,272,236.

Ethylene is further fed into a second polymerization reactor at a rate of 120 lbs./hr (54.5 kg/hr). Prior to introduction into the second polymerization reactor, the ethylene and a stream of hydrogen are combined with a diluent mixture comprising Isopar™ E hydrocarbon and 1-octene. With respect to the second polymerization reactor, the 1-octene:ethylene feed ratio (constituting fresh and recycled monomer) is 0.196:1 (mole percent), the diluent:ethylene ratio is 5.91:1 (weight percent), and the hydrogen:ethylene feed ratio is 0.24:1 (mole percent). A heterogeneous Ziegler catalyst and cocatalyst as prepared above are introduced into the second polymerization reactor. The catalyst (Ti) and cocatalyst (TEA) concentrations in the second polymerization reactor are $2.65\times10^{-3}$ and $1.65\times10^{-3}$ molar, respectively. The catalyst and cocatalyst flow rates into the second polymerization reactor are $4.49\times10^{-4}$ lbs. Ti/hr ($2.04\times10^{-4}$ kg Ti/hr) and $9.14\times10^{-3}$ lbs. TEA/hr ($4.15\times10^{-3}$ kg TEA/hr) respectively. The polymerization is conducted at a reaction temperature in the range of 130°–200° C. The conversion and production split between the first and second polymerization reactors is such as to yield the "percent of mixture" value for Example 1 set forth in Table 1.

To the resulting polymer, a standard catalyst kill agent (1250 ppm Calcium Stearate) and antioxidants (200 ppm Irganox™ 1010, i.e., tetrakis [methylene 3-(3,5-di-tertbutyl-4-hydroxy-phenylpropionate)]methane, available from Ciba-Geigy and 800 ppm Sandostab™ PEPQ, i.e., tetrakis-(2,4-di-tert-butyl-phenyl)-4,4'biphenylphosphonite, available from Sandoz hemical) are added to stabilize the polymer. Although the Calcium tearate is known to conventionally function as a processing aid, comparative experiments will show it does not contribute to the enhanced rheological properties of the substantially linear polymers useful in the invention.

The polymer mixtures of Examples 2 and 3 are prepared in a similar fashion. The split between the first and second polymerization reactors is such as to yield the "percent of mixture" values set forth in Table 1.

The densities, melt indices, and hexane extractive levels of the first reactor products, the second reactor products, and the resultant in-reactor mixtures as well as the Vicat softening point, density differential between the component polymers and expected n-hexane extractive amount of the in-reactor mixtures are further set forth in Table 1.

Examples 4–8 and Comparative Examples 9–13

The mixtures of Examples 4–8 are prepared by dry blending the substantially linear ethylene polymer component (A) and the heterogeneously branched linear ethylene polymer component (B) (or in the case of Example 5, the substantially linear ethylene polymer component (B)) in a lab scale mechanical tumble blender. Comparative Examples 9–11 are also prepared using the mechanical tumble blender. The component weight percentages based on the total weight of the respective polymer mixtures are set forth in Table 1. With respect to the individual component polymers, component (A) for Comparative Example 11 is a linear ethylene/1-butene copolymer commercially available from Mitsui Petrochemical Industries under the designation of Tafmer™ A4085. For Examples 4–8 and Comparative Examples 9–10, the substantially linear ethylene polymer component (A) and component (B) in the case of Example 5, is prepared by techniques disclosed in U.S. Pat. No. 5,272,236 via a solution ethylene/1-octene interpolymerization process utilizing a $((CH_3)_4C_5))$—$(CH_3)_2Si$—N—(t-$C_4H_9$)]Ti($CH_3$)$_2$ activated with tris(perfluorophenyl)borane and MMAO. To the resulting polymer, a standard catalyst kill agent and antioxidants described above are added to stabilize the polymer.

The heterogeneously branched components (B) of Examples 4–8 and Comparative Examples C9–C11 are solution-polymerized copolymers of ethylene and 1-octene manufactured with the use of a Ziegler titanium catalyst system. To the resulting polymers, Calcium Stearate, in quantities sufficient for functioning as a standard processing aid and as a catalyst kill agent, and as antioxidants, 200 ppm Irganox™ 1010 and 1600 ppm Irgafos™ 168, a phosphite stabilizer available from Ciba-Geigy, are added to stabilize the polymer and to enhance its rheological properties. Comparative Examples C12 and C13 are single polymer compositions in contrast to the above inventive and comparative polymer mixtures. Comparative Example C12 is a substantially linear ethylene/1-octene copolymer also prepared by techniques disclosed in U.S. Pat. No. 5,272,236 utilizing a $((CH_3)_4C_5))$—$(CH_3)_2Si$—N—(t-$C_4H_9$)]Ti($CH_3$)$_2$ activated with tris(perfluorophenyl)borane and MMAO. To the resulting polymer, calcium stearate as a catalyst kill agent and antioxidants as described above for Example 1 are added to stabilize the polymer. Comparative Example C13 is a heterogeneously branched linear ethylene/1-octene copolymer prepared in a solution process utilizing a Ziegler titanium catalyst system. The melt index of component (B) of Comparative Example C9 and the resultant mixture are reported as a corrected $I_2$ value using the correction factor discussed above. The component (B) second ethylene polymer of Comparative Example 9 has a measured $I_5$ melt index of 0.26 g/10 minutes which has been corrected to 0.05 g/10 min.

The densities, melt indices, and n-hexane extractive level of the component polymers, resultant polymer mixtures and single polymer compositions as well as the Vicat softening point, density differential between the component polymers and the expected n-hexane extractive amount of the mixtures are set forth in Table 1.

TABLE 1

| | Example | | | | | |
|---|---|---|---|---|---|---|
| | 1 | 2 | 3 | 4 | 5 | 6 |
| First Ethylene Polymer | | | | | | |
| Polymer Type | Substantially Linear | Substantially Linear | Substantially Linear | Substantially Linear | Substantially Linear | Substantially Linear |
| Density (g/cc) | 0.887 | 0.88 | 0.888 | 0.887 | 0.887 | 0.887 |
| $I_2$(g/10 min) | 1.0 | 5.0 | 0.6 | 0.5 | 0.5 | 0.5 |
| n-Hexane Extractives | 100 | 100 | 100 | 100 | 100 | 100 |
| Percent of Mixture (wt %) | 20 | 28 | 42 | 20 | 50 | 50 |
| Second Ethylene Polymer | | | | | | |
| Polymer Type | Heterogeneously Branched Linear | Heterogeneously Branched Linear | Heterogeneously Branched Linear | Heterogeneously Branched Linear | Substantially Linear | Heterogeneously Branched Linear |
| Density (g/cc) | 0.920 | 0.925 | 0.926 | 0.920 | 0.902 | 0.912 |
| $I_2$(g/10 min) | 1.0 | 1 | 1.4 | 1.0 | 1.0 | |
| n-Hexane Extractives (%) | <2 | <2 | <2 | <2 | <2 | <2 |
| Percent of | 80 | 72 | 58 | 80 | 50 | 50 |

TABLE 1-continued

| Mixture (wt %) Polymer Mixture | | | | | | |
|---|---|---|---|---|---|---|
| Density (g/cc) | 0.912 | 0.912 | 0.912 | 0.913 | 0.894 | 0.899 |
| First/Second Polymer Density Differential (g/cc) | 0.033 | 0.045 | 0.038 | 0.033 | 0.015 | 0.025 |
| $I_2$ (g/10 min) | 1.05 | 1.5 | 1.0 | 1.0 | 0.7 | 0.7 |
| n-Hexane Extractives (%) | 0.8 | 0.8 | 0.7 | ND | 2.5 | 4.3 |
| Expected n-Hexane Extractives (%) | 21.6 | 29.4 | 43.2 | 21.6 | 51.0 | 51.0 |
| Percent Lower Than Expected Extractive Amount | 96.3 | 97.3 | 98.4 | NA | 95.2 | 91.6 |
| Vicat Softening Point (VSP) (°C.) | 91.9 | 94.6 | 91.85 | 98.3 | 76.1 | 76.15 |

| | Example | | | | | | |
|---|---|---|---|---|---|---|---|
| | 7 | 8 | C9 | C10 | C11 | C12 | C13 |
| First Ethylene Polymer | | | | | | | |
| Polymer Type | Substantially Linear | Substantially Linear | Substantially Linear | Homo-Linear Branched Linear | None | Substantially geneously | Substantially Linear |
| Density (g/cc) | 0.887 | 0.896 | 0.887 | 0.871 | 0.881 | NA | 0.920 |
| $I_2$ (g/10 min) | 0.5 | 1.3 | 0.5 | 0.87 | 3.5 | NA | 1.0 |
| n-Hexane Extractives (%) | 100 | 100 | 100 | 100 | 100 | NA | <2 |
| Percent of Mixture (wt %) | 20 | 50 | 30 | 35 | 20 | 0 | 100 |
| Second Ethylene Polymer | | | | | | | |
| Polymer Type | Hetero-geneously Branched Linear | Hetero-geneously Branched Linear | Hetero-geneously Branched Linear | Hetero-geneously Branched Linear | Hetero-geneously Branched Linear | Hetero-geneously Branched Linear | None |
| Density (g/cc) | 0.935 | 0.935 | 0.942 | 0.920 | 0.920 | 0.912 | NA |
| $I_2$ (g/10 min) | 1.0 | 1.0 | 0.05 | 1.0 | 1.0 | 1.0 | NA |
| n-Hexane Extractives (%) | <2.0 | <2.0 | <2.0 | <2.0 | <2.0 | 2.3 | NA |
| Percent of Mixture (wt %) Polymer Mixture or Single Polymer | 80 | 50 | 70 | 65 | 80 | 100 | 0 |
| Density (g/cc) | 0.925 | 0.917 | 0.926 | 0.903 | 0.912 | 0.912 | 0.920 |
| First/Second Polymer Density Differential (g/cc) | 0.048 | 0.039 | 0.055 | 0.049 | 0.039 | None | None |
| $I_2$ (g/10 min) | 0.9 | 1.1 | −0.2 | 1.0 | 1.3 | 1.0 | 1.0 |
| n-Hexane Extractives (%) | 0.3 | ND | 0.9 | 11.8 | 1.2 | 2.3 | <2.0 |
| Expected n-Hexane Extractives (%) | 21.6 | NA | 31.4 | 36.3 | 21.6 | NA | NA |
| Percent Lower Than Expected Extractive Amount | 98.4 | NA | 97.1 | 67.4 | 94.3 | NA | NA |
| Vicat Softening Point (VSP) (°C.) | 113.15 | 95 | 109 | 64.6 | 99.05 | 96.1 | 108.7 |

ND denotes the measurement was not determined.
NA denotes the measurement is not applicable.

As illustrated in Table 1, although the polyethylene mixtures of Examples 1–8 contain at least 20 weight percent of a homogeneously branched substantially linear ethylene polymer component (A) which is substantially fully soluble in hexane, the mixtures of the invention are characterized by a relatively low compositional hexane extractive level, i.e., less than 4.5 weight percent. Table 1 also illustrates that the actual n-hexane extractive level of inventive mixture is at least 30% and as high as 98% lower than the expected extractive amount for the mixture. While not wishing to be bound by any particular theory, it is believed that the higher density, more crystalline ethylene polymer used in the Formation of Monolayer Films:

The mixtures of Examples 1–8 and the single polymer compositions and mixtures of Comparative Examples C9–C13 are fabricated into a 2 mil (0.051 mm) thick monolayer blown (tubular) film at about 200° C. melt temperature using a 2.5 inch (6.4 cm) diameter, 30:1 L/D Gloucester blown film line equipped with a 6 inch (15.2 cm) annular die. The monolayer blown films are evaluated for 1% and 2% secant modulus, Elmendorf tear, dart impact, and puncture resistance using the procedures described above. The results of the evaluation are set forth in Table 2.

TABLE 2

| | Example | | | | | | | | | | | | |
|---|---|---|---|---|---|---|---|---|---|---|---|---|---|
| | 1 | 2 | 3 | 4 | 5 | 6 | 7 | 8 | C9 | C10 | C11 | C12 | C13 |
| Monolayer Film Performance Properties | | | | | | | | | | | | | |
| 2% Secant Modulus (MD) (psi) (MPa) | 22,000 (152) | 22,147 (153) | 18,870 (130) | 19,541 (135) | 6,595 (45) | 8,989 (62) | 33355 (230) | ND | 41,887 (289) | 12,597 (87) | 20,278 (140) | 18,361 (127) | 25,325 (175) |
| 1% Secant Modulus (MD) (psi) (MPa) | ND | ND | ND | 21,522 (148) | 7,627 (53) | 10,421 (72) | 37,516 (259) | ND | 46,514 (321) | 14,299 (99) | 22,470 (155) | 21,176 (146) | 29,275 (202) |
| 2% Secant Modulus (CD) (psi) (MPa) | 26,000 (179) | 22,033 (152) | 24,590 (170) | 21,140 (146) | 7,052 (49) | 9,391 (65) | 36,440 (251) | ND | 48,964 (338) | 12,758 (88) | 22,725 (157) | 19,160 (132) | 25,863 (178) |
| 1% Secant Modulus (CD) (psi) (MPa) | ND | ND | ND | 22,993 (159) | 8,492 (59) | 10,898 (75) | 37,238 (257) | ND | 52,433 (362) | 14,953 (103) | 25,597 (176) | 21,511 (148) | 28,005 (193) |
| Elmendorf Tear (Type A) (MD) (grams) | 800 | 1,094 | 811 | 659 | 359 | 312 | 579 | 670 | 330 | 1,155 | 645 | 765 | 427 |
| Elmendorf Tear (Type A) (CD) (grams) | 980 | 1,222 | 1,030 | 877 | 512 | 482 | 891 | 900 | 907 | 1,414 | 794 | 912 | 749 |
| Dart Impact (Type B) (grams) | 512 | 646 | 850 | 698 | >850 | >850 | 323 | ND | 330 | 0 | 430 | 800 | 270 |
| Puncture Resistance (ft-lbs/cc) | 300 | 259 | 320 | 312 | 255 | 254 | 193 | 290 | 142 | 213 | 292 | 142 | 176 |

ND denotes the measurement was not determined.

invention as component (B) creates a tortuous path and, as suclh, significantly reduces the amount of n-hexane extractable material that would otherwise traverse and escape the polymer mixture matrix.

Further, the polymer mixtures of Examples 1–8 are characterized by a Vicat softening point greater than 75° C. Conversely, the Vicat softening point of Comparative Example C10 is too low for packaging applications requiring improved heat resistivity. Additionally, although the actual n-hexane extractive level of Comparative Example C10 is significantly lower than its expected n-hexane extractive amount, its actual n-hexane extractive level is still markedly higher (i.e., from 2.7 to 39 times higher) than that of preferred polymer mixtures of the invention. The deficiencies of Comparative Example C10 are thought to be due to the relatively low density (i.e., 0.903 g/cc) of the mixture. As such, for film and coating of thle invention, it is believed that where the density of thle component (A) polymer is equal to or less than 0.870 g/cc, the density of the component (B) polymer should be greater than 0.920 g/cc (i.e., the density differential between the first and second ethylene polymers should be greater than 0.049 g/cc) but still less than 0.942 g/cc.

As illustrated in Table 2, the polymer mixtures of Examples 1–8 exhibit a controllable 2% secant modulus (MD) as low as 6,595 psi in the case of Example 5 and as high as 33,355 psi in the case of Example 7. Table 2 also illustrates that the polymer mixtures of Examples 1–8 as well as the comparative mixtures of C9–C13 are characterized by an Elmendorf tear (MD) of at least 300 g, a Dart Impact (Type B) of at least 300 g, and a puncture resistance of at least 150 ft-lb/in$^3$ (126 kg-cm/cc), establishing additional criteria of a food packaging, resin.

Formation of Coextruded Films:

The mixtures of Examples 1–8 and the single polymer compositions and mixtures of Comparative Examples C9–C13 are fabricated into a 3.5 mil (0.89 mm) thick coextruded film using a coextrusion blown film unit manufactured by Egan Machinery equipped with two 30:1 L/D 2.5 inch (6.4 cm) diameter extruders, one 30:1 L/D 2 inch (5.1 cm) extruder and an 8 inch (20.3 cm) spiral mandrel annular die. The individual layers of the film are as follows: 1 mil (0.025 mm) nylon; 1 mil (0.025 mm) Primacor™ 1410 an ethylene-acrylic acid (EAA) copolymer available from The Dow Chemical Company); and 1.5 mil (0.038 mm) of Examples 1–8 or Comparative Examples C9–C13. The resultant coextruded films are evaluated for heat seal initiation temperature, hot tack initiation temperature, and ultimate hot tack strength. The results of the evaluation are set forth in Table 3.

TABLE 3

| | Example | | | | | | | | | | | | |
|---|---|---|---|---|---|---|---|---|---|---|---|---|---|
| | 1 | 2 | 3 | 4 | 5 | 6 | 7 | 8 | C9 | C10 | C11 | C12 | C13 |
| Coextruded Film Performance Properties | | | | | | | | | | | | | |
| Heat Seal Initiation Temperature (°C.) | 81 | 71 | 76 | 77 | 63 | 65 | 98 | 87 | 116 | 54 | 73 | 103 | 108 |
| Hot Tack Initiation Temperature (°C.) | 80 | 69 | 75 | 78 | 68 | 67 | 102 | 92 | ~110 | 48 | 80 | 108 | 109 |
| Ultimate Hot Tack Strength N/in(N/cm) | 7.3 (2.87) | 7.2 (2.83) | 11.8 (4.64) | 7.4 (2.91) | 7.1 (2.79) | 7.9 (3.11) | 9.7 (3.82) | 6.6 (2.60) | 3.8 (1.48) | 10.0 (3.94) | 6.1 (2.40) | 8.2 (3.23) | 9.4 (3.70) |
| VSP - Heat Seal Initiation Temperature (°C.) | 10.9 | 23.6 | 15.9 | 21.3 | 13.1 | 11.2 | 15.2 | 8.0 | −7.0 | 10.6 | 26.1 | −6.9 | 0.7 |

Heat Sealability

As illustrated in Table 3, the polymer mixtures of Examples 1–8 exhibit a heat seal initiation temperature of less than 100° C. and as low as 63° C. as in the case of Example 5, and a differential between the Vicat softening point of the polymer mixture and the heat seal initiation temperature of a 1.5 mil (0.038 mm) film layer fabricated of the polymer mixture of at least 8° C. (as in the case of Examples 1–8), of at least 10° C. (as in the case of Examples 1–7), of at least 15° C. (as in the case of Examples 2–4, and 7), and of at least 20° C. (as in the case of Examples 2 and 4). Comparative Examples C9, C12 and C13 all have heat seal and hot tack initiation temperatures that merely approximate their respective Vicat softening points Table 3 also illustrates Comparative Example C11 is also characterized by a desirably low heat seal and hot tack initiation temperature and a desirably high differential between its Vicat softening point and its heat seal initiation temperature.

Regression Analysis

Figure 2:
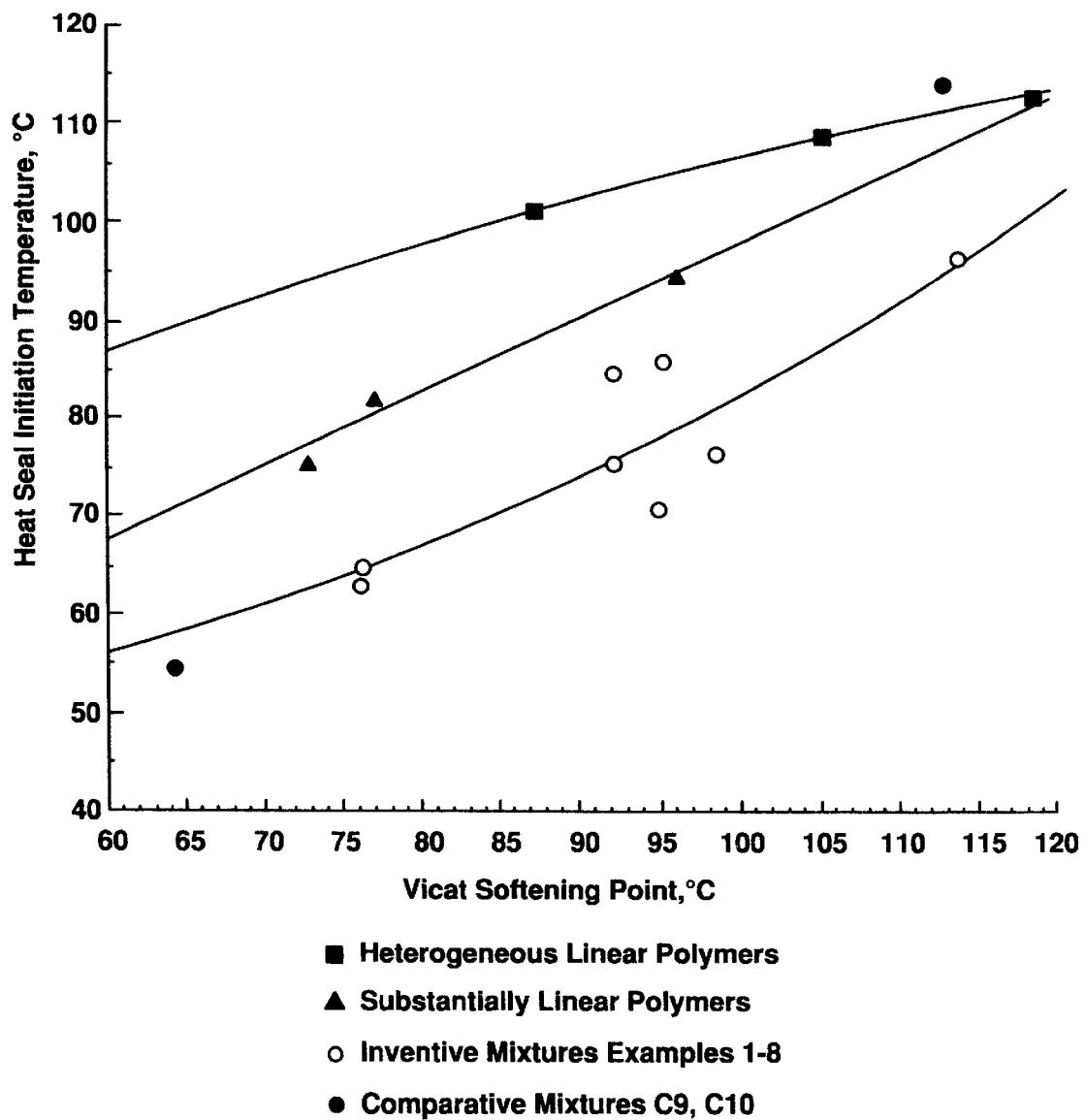
FIG. 2 is a plot of heat seal initiation temperature as a function of Vicat softening point in °C. for Example and Comparative polymer mixtures and for single polymer compositions of substantially linear ethylene polymers and heterogeneously branched linear ethylene polymers.

In another evaluation, the heat seat initiation temperatures of the mixtures and single polymer compositions (as well as other single composition illustrated in Table 4 and designated Comparative Examples C14–C19) are plotted as function of the Vicat softening point for the material. The individual relationships are subjected to first and second order linear regression analysis using (Cricket Graph computer softwvare Version 1.3 supplied comnmercially bay Cricket Software Company to establish an equation for the respective relationships. FIG. 2 illustrates the resulting equations and that, desirably, the heat seal initiation temperature of a given inventive mixture is at least 13% lower in the case of Examples 1–8, at least 20% lower in the case of Example 1–6 and 8, and at least 25% lower in the case of Examples 2–6 than a heterogeneously linear polymer having essentially the same Vicat softening point.

TABLE 4

| Heterogeneous Linear Ethylene Polymers | | | | | | |
|---|---|---|---|---|---|---|
| Comparative Example | Density (g/cc) | Melt Index (g/10 minutes) | Vicat Softening Point (°C.) | Heat Seal Initiation Temperature (°C.) | Hot Tack Initiation Temperature (°C.) | Vicat - Heat Seal Initiation |
| C12 | 0.912 | 1.0 | 96 | 103 | 108 | −7 |
| C14 | 0.935 | 1.1 | 119 | 116 | 117 | 3 |
| C15 | 0.920 | 1.0 | 105 | 111 | 109 | −6 |
| C16 | 9.905 | 0.80 | 83 | 87 | 103 | −4 |

| Substantially Linear Ethylene Polymers | | | | | | |
|---|---|---|---|---|---|---|
| Comparative Example | Density (g/cc) | Melt Index (g/10 min.) | Vicat Softening Point (°C.) | Heat Seal Initiation Temperature (°C.) | Hot Tack Initiation Temperature (°C.) | Vicat - Heat Seal Initiation |
| C13 | 0.920 | 1.0 | 108.7 | 108 | 109 | 0.7 |
| C17 | 0.908 | 1.0 | ND | 91 | 99 | NA |
| C18 | 0.902 | 1.0 | 89 | 83 | 88 | 6 |
| C19 | 0.895 | 1.3 | 73 | 76 | 85 | −3 |

TABLE 4-continued

Ethylene Vinyl Acetate (EVA) Copolymers

| Comparative Example | Percent Vinyl Acetate | Melt Index (g/10 min.) | Vicat Softening Point (°C.) | Heat Seal Initiation Temperature (°C.) | Hot Tack Initiation Temperature (°C.) | Vicat - Heat Seal Initiation |
|---|---|---|---|---|---|---|
| C20 | 12 | 0 | 79 | 86 | None (strength was below the 1.6 N/cm threshold) | −7 |
| C21 | 18 | 0.80 | 65 | 80 | None (strength was below the 1.6 N/cm threshold) | −15 |

ND denotes the measurement was not determined

Hot Tackability

Figure 3:
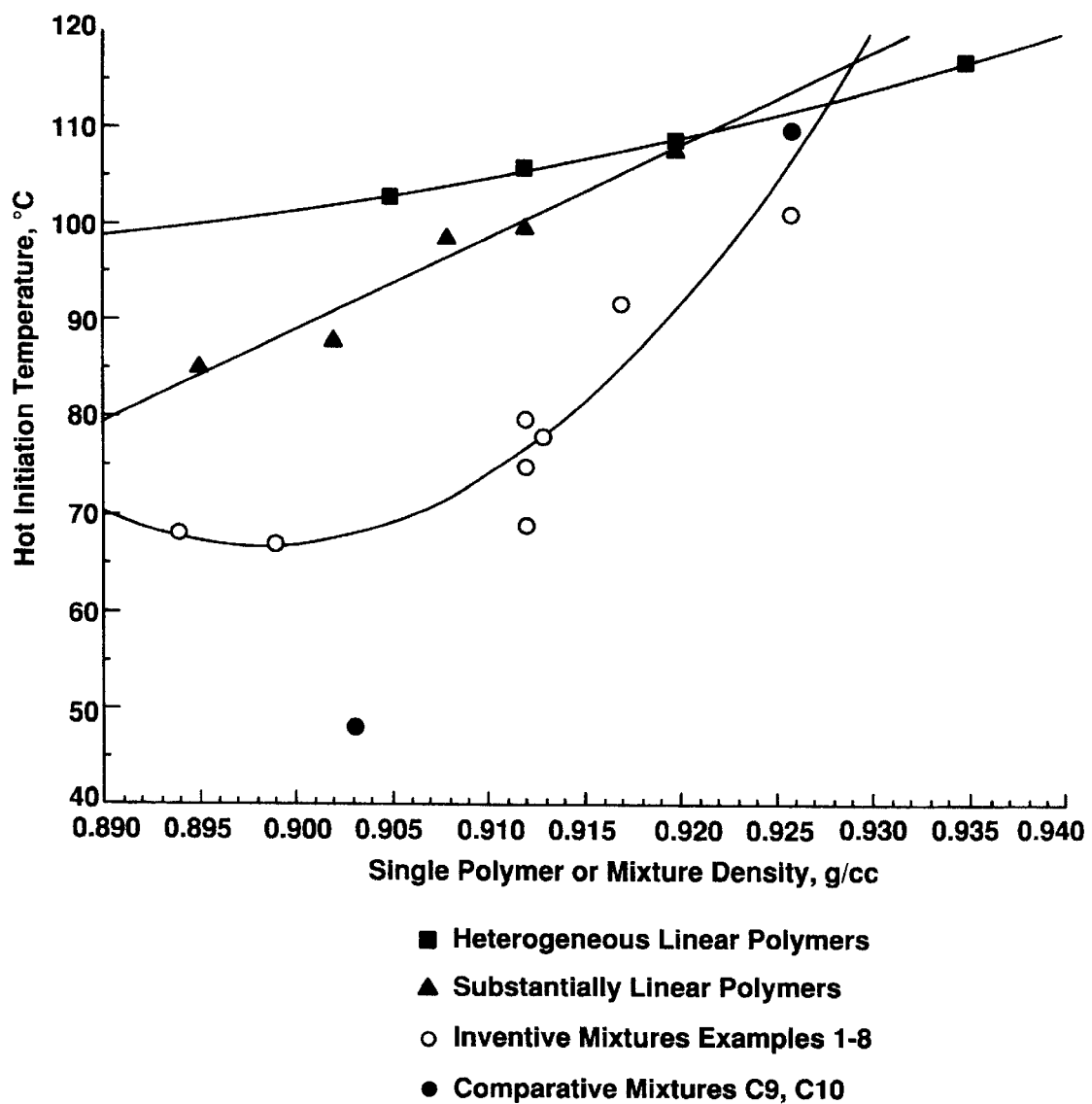
FIG. 3 is a plot of hot tack initiation temperature in °C. as a function of density in g/cc for Example and Comparative polymer mixtures and for single polymer compositions of substantially linear ethylene polymers and heterogeneously branched linear ethylene polymers.
Figure 4:
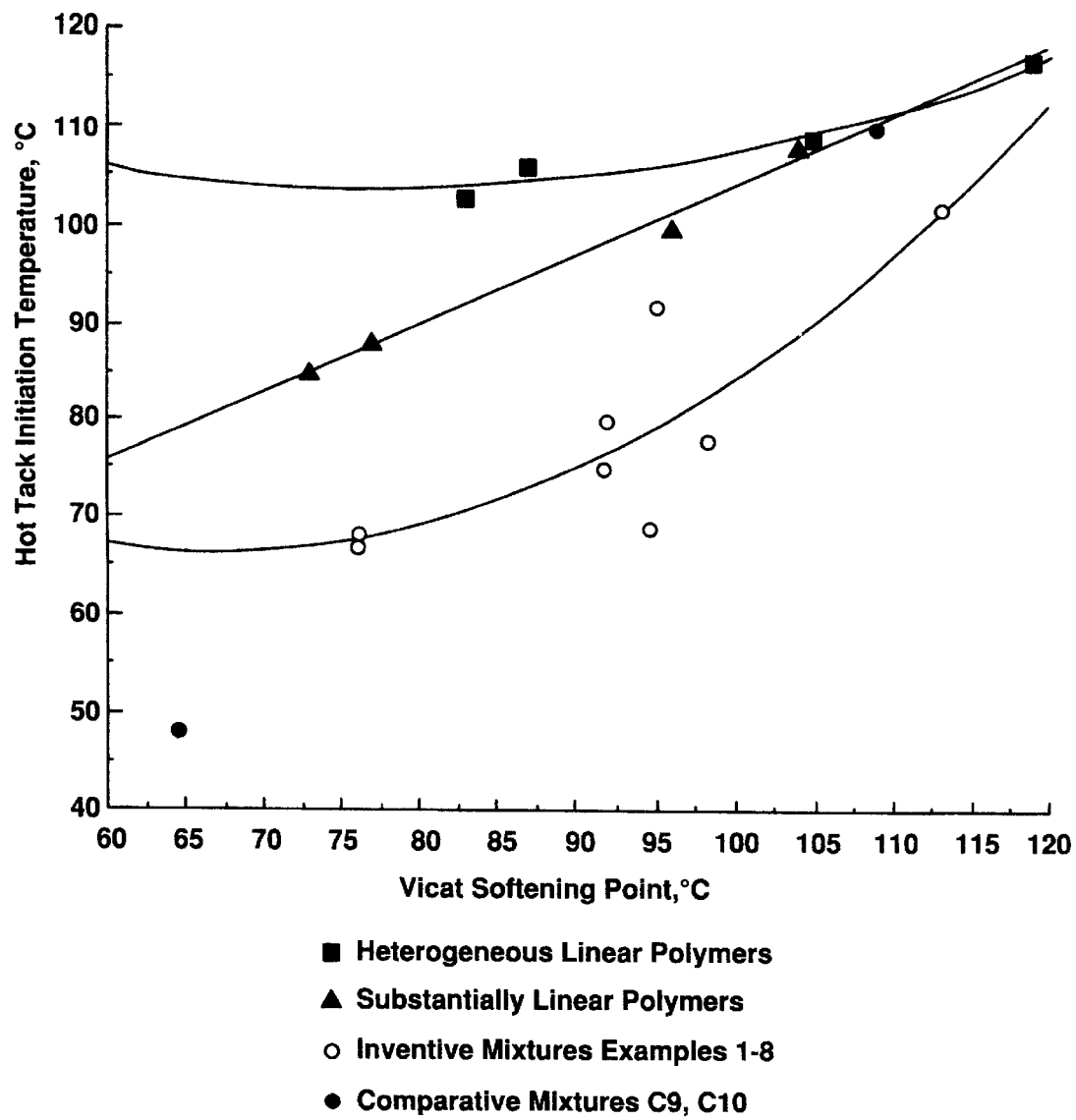
FIG. 4 is a plot of hot tack initiation temperature in °C. as a function of Vicat softening point in °C. for Example and Comparative polymer mixtures and for single polymer compositions of substantially linear ethylene polymers and heterogeneously branched linear ethylene polymers.

In another evaluation, the hot tack initiation temperatures of the mixtures and single polymer compositions (as well as other single polymer compositions illustrated in Table 4 and designated Comparative Examples C14–C19) are plotted as function of the density and Vicat softening point for the material. In the same fashion as above, these individual relationships are subjected to first and second order linear regression analysis to establish an equation for the corresponding relationship. FIG. 3 and 4 illustrate the resulting equations and that, desirably, the hot tack initiation temperature of a given inventive mixture is at least 10% lower in the case of Examples 1–8, at least 20% lower in the case of Examples 1–6, and at least 30% lower in the case of Examples 2–6 than a heterogeneously linear polymer having essentially the same density or Vicat softening point.

The low heat seal and hot tack initiation temperatures of the inventive mixtures permits industrial fablricators to increase productivity by making fmore seals per unit time and, as such, fabricating more bags, pouches, and other packages and containers that are produced by creating heat seals. By having Vicat softening points several degrees higher than their respective heat seal initiation temperatures, the inventive polymer mixtures will better maintain seal integrity during use in packaging applications involving high temperatures (for example, about 45° C.) such as hot-fill packaging where items are packaged hot and dropped onto bottom seals, cook-in applications and boil-in-bag applications.

Table 3 further illustrates that the ultimate hot tack strength of Examples 1–8 is greater than or equal to 6.5 N/in. (2.56 N/cm) and is as high as 11.8 N/in (4.65 N/cm) in the case of Example 3. The ultimate hot strength of the comparative mixtures, including C11 which is exemplary of the mixture disclosed by Shibata et al. in U.S. Pat. No. 4,429,079, are all less than 6.5 N/in (2.56 N/cm). The high ultimate hot tack strength of the inventive mixture is particularly important in vertical form/fill/seal packaging applications where the items to be packaged are dropped into the package and onto the bottom hot tack seal immediately after the seal is formed. High hot tack strength insures the bottom seal will not rupture during loading of the items and, as such, will help eliminate leakers and spillage of the items.

Vertical Form/Fill/Seal Machinability

In another evaluation, Example 2 is evaluated for its machiniability performance when processed through automated converting and packaging equipment. Good "machinability", as the term is used herein, refers to the ability to convert film into non-filled packages on high speed packaging equipment without generating packages that are outside of the desired package specification or having premature equipment shutdowns.

Machinability is determined by first fabricating from Example 2 a 2.0 mil (0.051 mm) thick monolayer film using the Gloucester blown film unit described above. Then the film is run through a Hayssen Ultima Super CMB Vertical Form/Fill/Seal (VFFS) machine for at least 5 minutes to determine whether 7 inch wide×9.5 inch long (17.8 cm wide×24.1 cm long) pouches can be produced at a rate of 25 pouches/minute and at a higher rate of 50 pouches/minute. In this evaluation, the film fabricated from Example 2 shows good machinability. Non-filled pouches within the desired dimensional specification were prepared at the rates of 25 and 50/minute without any equipment shutdowns.

For purposes of comparison, Comparative Example 21, which is an ethylene vinyl acetate (EVA) copolymer containing 18 weight percent vinyl acetate and having heat seal characteristics comparable to Example 2 (See, Table 4), is also evaluated for VFFS non-filled packaging machinability. However, Comparative Example 21 experienced continuous equipment interruptions and shutdowns and could not be processed at a packaging speed as low as 20 non-filled pouches per minute in this evaluation. The poor performance of Comparative Example 21 is attributable to its tackiness and low modulus (poor dimensional stability) whiclh results in the film excessively necking-down and dragging on the forming tube of the VFFS unit.

Cook-In Performance

In another evaluation, Example 2 is evaluated for its cook-in performance by procedures pursuant to tlhose disclosed in U.S. Pat. No. 4,469,742, which is incorporated herein by reference. In this evaluation a 3.5 mil (0.89 mm) thick coextruded film consisting of 1.5 mils (0.038 mm) of nylon/1.0 mil (0.25 mm) Primacor™ 1410/1.5 mils (0.038 mm) of Example 2 is fabricated using the Egan coextrusion line described above. The nylon material, as for all other nylon/adhesice/sealant film structures used and disclosed herein, is Capron Xtraform™ 1590F Nylon 6/6, 6 copolymer supplied commercially by Allied Chemical Company. The Hayssen VFFS unit described above is also used in combination with a Pro/Fill 3000 Liquid Filler unit in this evaluation. The temperature of the sealing bars and platen for making bottom, top and side fin seals to prepare the pouches is set at 250° F.(121° C.). Using the coextruded film, 7 inch wide×9.5 inch long (17.8 cm wide×24.1 cm long) pouches are prepared and filled with 1,000 milliliters of water on the VFFS unit at a rate of 15 filled pouches per minute. Five water filled and heat sealed pouches are collected and placed into a large water-tight pan. The pan is then filled witlh water, covered with a suitable lid and placed in a Blue M forced-air convection oven and permitted to stand for 17 hours at 85° C. After 17 hours of oven time, the five pouches are removed from the oven and allowed to cool to ambient and inspect for seal integrity, In this evaluation, no leakers due to seal ruptures, delamination or cracking were detected. All five pouches fabricated from Example 2 passed this cook-in evaluation in accordance to criteria provided in U.S. Pat. No. 4,469,742.

Shrink Response Evaluation

In another evaluation, a polymer mixture designated Example 22 is 20 prepared by tumble blending, as component (A), 22 percent by weight of the total mixture of a substantially linear ethylene/1-octene copolymer having a density of 0.870 g/cc and produced according to techniques described in U.S. Pat. No. 5,272,236 and, as component (B), 78 percent by weight of the total mixture of a heterogeneously branched ethylene/1-octeine copolymer having a density of 0.935 g/cc and produced using a solution polymerization process and a Ziegler-type titanium catalyst. The mixture is then melt mixed on a 30 mm Werner-Pflieder ZSK co-rotating, twin screw extruder and pelletized. The mixture, which is characterized as having a density of 0.920 g/cc, is then extruded into 200 mil (51 mm) thick sheet using a conventional cast film extruder unit equipped with a slot die and the melt temperature set at 415° F. (213° C.) and the chill roll set at 67° F. (19° C.). The resulting extruded sheet is then cut into four 2 inch×2 inch (5.1 cm×5.1 cm) sheets and biaxially stretched individually using a T.M. Long laboratory stretching frame. The sheets are stretched to a thickness of 1 mil (0.025 mm) using the various settings shown in Table 5 below.

TABLE 5

| | |
|---|---|
| Stretch Temperature Setting | 245° F. (118° C.), top and bottom platens |
| Preheat Time | 10 minutes |
| Stretch Rate | 5 in/min. (12.7 cm/min.) in both the machine and traverse directions |
| Stretch Mode | Simultaneous Stretching |
| Stretch Ratio | 4.5 × 4.5 |

After the biaxial stretching operation, the sheets are tested for free shrinkage at 250° F. (121° C.) in accordance with ASTM D2732 and averaged to determine the total shrink response. The average free shrinkage of sheet fabricated from Example 21 measured 27 percent in the machine direction and 25 percent in the traverse direction. The mixtutre also had an orientation temperature range of at least 11° C. which is broader than that of typical homogeneously branched ethylene polymers. As such, Examples 1–8 and 22 are believed to be well-suited for use in fabricating, biaxially oriented films for use in such applications as, for example, barrier shrink packaging of primal and subprimal meat.

Fabrication of Molded Articles

In an injection molding evaluation, Examples 23–26 and Comparative Examples C29–C31 are prepared by dry blending followed by melt mixing at about 149° C. in a 1 inch (2.5 cm) diameter 24:1 L/D MPM extruder. Table 6 provide a description of the component polymers as well the component weight percentages expressed as "percent of mixture". Tlhe melt extrusion conditions for use in preparing Examples 23–26 and Comparative Examples C29–C31 are shown in Table 7. Examples 27 and 28 are prepared by operating two polymerization reactors sequentially in a manner similar to that described for Example 1, utilizing reactor splits (conversion and production rates) that correspond to tile percent of imixture in Table 6.

Examples 23–28 are also compared to Comparative Examples C32 and C33 which are single-reactor homogeneously branched and single-reactor heterogeneously branched resins, respectively. Comparative Example C32 is an experimental substantially linear ethylene polymer resin produced according to the disclosure by Lai et al. in U.S. Pat. No. 5,272,236 and U.S. Pat. No. 5,272,272. Comparative Example C33 is a molding grade resin supplied by The Dow Chemical Company under the designation of Dowlex™ 2500.

TABLE 6

| | Example | | | | | |
|---|---|---|---|---|---|---|
| | 23 | 24 | 25 | 26 | 27 | 28 |
| First Ethylene Polymer | | | | | | |
| Polymer Type | Substantially Linear | Substantially Linear | Substantially Linear | Substantially Linear | Substantially Linear | Substantially Linear |
| Density (g/cc) | 0.870 | 0.886 | 0.870 | 0.880 | 0.870 | 0.865 |
| $I_2$(g/10 min) | 30.0 | 30 | 30 | 30 | 3.0 | 8.0 |
| n-Hexane Extractives | 100 | 100 | 100 | 100 | 100 | 100 |
| Percent of Mixture (wt %) | 38 | 50 | 34 | 45 | 37 | 38 |
| Second Ethylene Polymer | | | | | | |
| Polymer Type | Substantially Linear | Substantially Linear | Heterogeneously Branched Linear | Heterogeneously Branched Linear | Heterogeneously Branched Linear | Heterogeneously Branched Linear |
| Density (g/cc) | 0.940 | 0.940 | 0.935 | 0.935 | 0.941 | 0.946 |
| $I_2$(g/10 min) | 27 | 27 | 40 | 58 | 40 | 40 |
| n-Hexane Extractives (%) | <2 | <2 | <2 | <2 | <2 | <2 |
| Percent of | 62 | 50 | 66 | 55 | 63 | 62 |

TABLE 6-continued

Mixture (wt %)
Polymer Mixture

| | | | | | | |
|---|---|---|---|---|---|---|
| Density (g/cc) | 0.9133 | 0.9132 | 0.9128 | 0.9136 | 0.913 | 0.9137 |
| First/Second Polymer Density Differential (g/cc) | 0.070 | 0.054 | 0.065 | 0.049 | 0.071 | 0.073 |
| $I_2$(g/10 min) | 27.12 | 24.68 | 38.85 | 34.00 | 19.48 | 21.82 |
| n-Hexane Extractives (%) | 9.32 | 6.64 | 10.27 | 6.27 | 4.53 | 16.4 |

| | Example | | | | |
|---|---|---|---|---|---|
| | C29 | C30 | C31 | C32 | C33 |
| First Ethylene Polymer | | | | | |
| Polymer Type | Substantially Linear | Heterogeneously Branched Linear | Substantially Linear | Substantially Linear | None |
| Density (g/cc) | 0.940 | 0.935 | 0.886 | 0.913 | NA |
| $I_2$(g/10 min) | 27 | 40 | 30 | 30 | NA |
| n-Hexane Extractives | <2 | <2 | 100 | <2 | NA |
| Percent of Mixture (wt %) | 26 | 30 | 32 | 100 | NA |
| Second Ethylene Polymer | | | | | |
| Polymer Type | Substantially Linear | Substantially Linear | Heterogeneously Branched Linear | None | Heterogeneously Branched Linear |
| Density (g/cc) | 0.903 | 0.9027 | 0.925 | NA | 0.9269 |
| $I_2$(g/10 min) | 30 | 30 | 58 | NA | 60.08 |
| n-Hexane Extractives (%) | <2 | <2 | <2 | NA | <2 |
| Percent of Mixture (wt %) | 74 | 70 | 68 | NA | 100 |
| Polymer Mixture | | | | | |
| Density (g/cc) | 0.9137 | 0.9121 | 0.9144 | 0.913 | 0.927 |
| Component Density Differential (g/cc) | 0.037 | 0.032 | 0.039 | NA | NA |
| $I_2$(g/10 min) | 26.24 | 31.00 | 45.28 | 30.00 | 60.08 |
| n-Hexane Extractives (%) | 2.09 | 2.42 | 5.18 | <2 | <2 |

NA denotes the measurement is not applicable.

TABLE 7

| Example | Zone 1 Temp. (Actual/Set) (°F.) (°C.) | Zone 2 Temp. (Actual/Set) (°F.) (°C.) | Die Temp. (Actual/Set) (°F.) (°C.) | Melt Temp. (°F.) (°C.) | Extruder RPM | Extruder Pressure (psi) (MPa) |
|---|---|---|---|---|---|---|
| 23 | 299/300 (148/149) | 309/300 (154/149) | 296/300 (147/149) | 290 143 | 190 | 440 3.0 |
| 24 | 300/300 (149/149) | 301/300 (149/149) | 301/300 (149/149) | 280 138 | 190 | 460 3.2 |
| 25 | 300/300 (149/149) | 300/300 (149/149) | 300/300 (149/149) | 290 143 | 190 | 395 2.7 |
| 26 | 301/300 (149/149) | 301/300 (149/149) | 301/300 (149/149) | 280 138 | 190 | 415 2.9 |
| C29 | 300/300 (149/149) | 301/300 (149/149) | 300/300 (149/149) | 290 143 | 190 | 450 3.1 |
| C30 | 301/300 (149/149) | 300/300 (149/149) | 300/300 (149/149) | 279 137 | 190 | 440 3.0 |
| C31 | 300/300 (149/149) | 301/300 (149/149) | 300/300 (149/149) | 286 141 | 190 | 370 2.6 |
| C33 | 300/300 (149/149) | 301/300 (149/149) | 301/300 (149/149) | 276 136 | 190 | 300 2.1 |

Examples 23–28 and Comparative Examples C29–C31 and C33 are all injection molded at 200° C. using a 150-ton DeMag injection molding machine equipped witli reciprocating screw and a six-cavity ASTM plaqute mold to produce 6×½×⅛ inch (15.2×1.3×0.3 cm) flex bars. Although the melt index of the Example and Comparative Example polymer mixtures is lower than the Dowlex™ 2500 resin (Comparative Example C33), all polymer mixtures shiow good molding characteristics such is good flowability and mold filling capability as well as short cycle times. Table 8 sets forth the physical properties of the injection molded parts. Flexural modulus determination are performed in accordanice with ASTM D790 test methods.

TABLE 8

| Example | Melt Index (g/10 min) | $I_{10}/I_2$ | Density (g/cc) | Flexural Modulus (psi) (MPa) |
|---|---|---|---|---|
| 23 | 27.12 | 6.29 | 0.9133 | 22,921 (158) |
| 24 | 24.68 | 6.46 | 0.9132 | 20,430 (141) |
| 25 | 38.85 | 7.07 | 0.9128 | 19,354 (133) |
| 26 | 34.00 | 7.02 | 0.9136 | 20,821 (144) |
| 27 | 19.48 | 7.69 | 0.9135 | 23,711 (163) |
| 28 | 21.82 | 675 | 0.9137 | 24,486 (169) |
| C29 | 26.24 | 6.45 | 0.9137 | 17,210 (119) |
| C30 | 31.00 | 6.49 | 0.9121 | 17,249 (119) |
| C31 | 45.28 | 6.94 | 0.9144 | 19,770 (136) |
| C32 | 30.00 | ND | 0.9130 | 17,259 (119) |
| C33 | 60.08 | 6.85 | 0.9269 | 36,101 (249) |

ND denotes the measurement was not determined.

As expected due to the lower final density of the mixtures (0.913 g/cc) compared to the density of Comparative Example C33 (0.927 g/cc), the flexural modulus of the injection molded flex bars fabricated from the various polymer mixtures is significantly lower (32–52%) than the higher density LLDPE resin (Comparative Example C 33).

Heat Resistance Evaluation

The injection molded parts are also tested for hieat resistaince to low-frequency microwave radiation. For microwave resistance testing, Examples 23–28 and comparative Examples C29–C3 are injection molded at 200° C. into 3 inch (7.6 cm) diameter, 125 mil (0.3 cm) thick circular disks using the DeMag molder described above and allowed to cool to an ambient temperature. The disks are tested individually by placing each disk over a 2 inch (5.1 cm) diameter, 12 ounce (354 cc) microwave-resistant polypylene container and filled with about 6 ounces (177 cc) of commercial spaghetti sauce, i.e., Ragu® chunky garden style spaghetti sauce. Each disk and container is then placed into a General Electric Spacesaver® microwave for 5 minutes at the highest temperature setting. The GE Spacesaver microwave is a typical low-frequency consumer microwave unit. After 5 minutes in the microwave, the disk is removed, allowed to cool to an ambient temperature and then rinsed with cool running tap water. During the rinse, the disk is carefully held with its length parallel to the stream of tap water. The amount of distortion for each disk is measured as warpage in centimeters by laying the disk on a flat horizontal surface and determining the distance from the flat surface to the apex (highest point) of the warpage. Table 9 shows the microwave heat resistance or warp resistance results.

Figure 5:
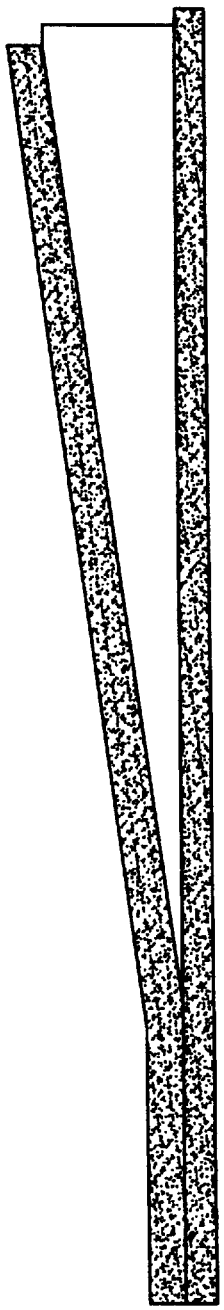
FIG. 5 is a graphical illustration of the proper alignment between an initial, unexposed print of the edge configuration of an ASTM flex bar and a subsequent bar print following exposure to an elevated oven temperature. The distance between the bar prints is taken as heat sag in centimeters for Examples.

To further define the heat resistance of these novel mixtures, heat sag performance testing is also performed. Injection molded flex bars are prepared using the DeMag molder described above. Thie edge configuration of individual bars are recorded (printed) by firmly placing a bar edge on a rubber stamp ink pad and stamping the configuration on a sheet of plain paper. After the edge configurations are recorded, five bars are then affixed to a metal rack having five spring clamps aligned vertically and spaced 3 cm apart. The bars are loaded into individual Spring clamps (one bar per clamp) such that a ¼ inch (0.64 cm) of the bar length is within the jaws of the clamp and the remaining 5-¾ inch (14.6 cm) length is allowed to remain suspended free of any obstructions or support. The rack containing the suspended flex bars is then placed into a Blue M forced-air convection oven set at 100° C. for 10 minutes. After the 10 minute period the rack is removed from oven and allowed to cool to an ambient temperature. Each bar edge is then inked again with the inking pad and stamped on the paper adjacent to its previous configuration print. This second print is done in such a manner that the end of the bar that was clamped is aligned to the left of the previous edge print. Then, from the paper displaying the two prints, the maxium distance between inner surfaces of the edge prints is measured in millimeters and recorded. FIG. 5 graphically illustrates the proper alignment of the bar prints for heat sag performance determinations. The measurement is repeated for each of the five bars, averaged and reported as heat sag performance for the Example. The heat sag performance of the various materials is also summarized in Table 9. Examples 23–28 all show good heat sag resistance in that lower heat sag values are taken as characteristics of improved heat resistance performance. Surprisingly, although Examples 23–28 have a relatively low flexural modulus as set forth in Table 8, Table 9 indicates these novel mixtures have excellent heat resistance.

TABLE 9

| Example | Microwave Warp Distortion (cm) | Heat Sag (cm) |
|---|---|---|
| 23 | 0.16 ± 0.03 | 1.43 ± 0.14 |
| 24 | 0.54 ± 0.05 | 2.61 ± 0.27 |
| 25 | 0.73 ± 0.13 | 2.06 ± 0.14 |
| 26 | 0.65 ± 0.13 | 3.14 ± 0.20 |
| 27 | ND | 1.62 ± 0.29 |
| 28 | ND | 1.29 ± 0.01 |
| C29 | 0.84 ± 0.05 | 4.59 ± 0.31 |
| C30 | 0.85 ± 0.04 | 5.40 ± 0.22 |
| C31 | 0.70 ± 0.09 | 3.22 ± 0.25 |
| C32 | ND | 3.84 ± 0.19 |
| C33 | 0.83 ± 0.12 | 1.13 ± 0.19 |

ND denotes measurement was not determined.

Percent Residual Crystallinity Testing

The residual crystallinity of the several Examples and Comparative Examples at elevated temperatures (100° and 110° C.) is measured by differential scanning calorimetry (DSC). The residual portion of the polymer mixtures and single-reactor resins above 100° C. actually quantified is illustrated graphically in FIG. 6. The percent residual crystallinity is taken from first heat determinations and calculated according to the following formula:

% residual crystallinity=(heat of fusion÷292J/cc)×% area above 100° or 110° C.

The DSC results are shown in Tables 10 and 11 and are also graphically illustrated in FIG. 1 for various polymer mixtures and single-reactor polymers. From regression analysis utilizing the Cricket Graph software described above, inventive mixtures were determined to have a percent residual crystallinity, PRC, as defined by the equation:

$$PRC \geq 6.4363 \times 10^4(\rho) - 3.4701 \times 10^4(\rho)^2 - 2.9808 \times 10^4,$$

where $\rho$ is the density of the polymer mixture in grams/cubic centimeters.

It should be noted that Example 9 in Table 10 is the same polymer mixture represented above as Comparative Example C9 in Tables 1 and 2. Since the percent residual crystallinity of Example 9 is defined by the equation immediately above and the mixture is considered useful for preparing the molded articles of the invention, Example 9 is considered a part of the present invention. As discussed above in reference to sealant layers, the mixture is simply not preferred with respect to the films and coatings of the invention.

TABLE 10

| Example | % Residual Crystallinity above 100° C. | % Residual Crystallinity above 110° C. |
|---|---|---|
| 5 | 1.8 | 0.3 |
| 6 | 9.2 | 5.9 |
| 7 | 37.8 | 31.7 |
| 9 | 37.2 | 32.5 |
| 23 | 33.3 | 29.8 |
| 24 | 28.2 | 24.7 |
| 25 | 28.9 | 22.9 |
| 26 | 27.2 | 17.4 |
| 27 | 30.2 | 24.8 |
| 28 | 32.9 | 29.3 |
| C29 | 20.4 | 16.5 |
| C30 | 14.5 | 10.0 |
| C31 | 21.6 | 14.6 |
| C33 | 32.7 | 22.1 |

TABLE 11

| Comparative Example | Density (g/cc) | Melt Index (g/10 min.) | Percent Residual Crystallinity at 100° C. | Percent Residual Crystallinity at 110° C. |
|---|---|---|---|---|
| Heterogeneous Linear Ethylene Polymers | | | | |
| C12 | 0.912 | 1.0 | 19.3 | 7.4 |
| C14 | 0.935 | 1.1 | 42.3 | 33.7 |
| C15 | 0.920 | 1.0 | 27.5 | 18.3 |
| C16 | 0.905 | 0.8 | 15.2 | 10.4 |
| C33 | 0.927 | 60.1 | 32.7 | 22.1 |
| Substantially Linear Ethylene Polymers | | | | |
| C13 | 0.920 | 1.0 | 29.1 | 15.0 |
| C32 | 0.913 | 29.3 | 15.8 | 0.3 |
| C34 | 0.903 | 30.0 | 1.9 | 0 |
| C35 | 0.940 | 27.0 | 50.4 | 44.5 |
| C36 | 0.902 | 3.6 | 4.1 | 0 |
| C37 | 0.934 | 2.6 | 46.9 | 41.0 |
| C38 | 0.937 | 2.2 | 49.1 | 43.6 |

Further, FIG. 1 also shows that for inventive polymer mixtures having a density in the range of 0.900 to 0.930 g/cc, particularly in the range of 0.903 to 0.928 g/cc show a significantly higher percent residual crystallinity at 100° C. than single-reactor, non-mixed polymers having essentially the same density. As compared to a linear ethylene polymers having essentially the same density in the range of 0.903–0.928 g/cc, Examples 7, 23, 25–28 have at least 17.5% higher, Examples 23, 25–28 have at least 35% higher, and Examples 23 and 28 have at least 50% higher percent residual crystallinities. As compared to substantially linear ethylene polymers which are substantially amorphous at lower densities, Examples 7, 23, 25–28 all show dramatically higher percent residual crystallinities.

While a higher crystallinity may explain improved heat resistance and/or higher Vicat softening points of the Examples, it is completely unexpected that materials with higher crystallinities also show lower flexural moduli or lower heat seal and hot tack initiation temperatures.

We claim:

1. A molded article comprising a polymer mixture, wherein the polymer mixture comprises
   (A) from 15 to 60 weight percent, based on the total weight of the mixture, of at least one first ethylene/α-olefin polymer which is a substantially linear ethylene polymer having a density in the range of 0.850 to 0.920 g/cc, wherein the substantially linear ethylene polymer is further characterized as having
      i. a melt flow ratio, $I_{10}/I_2 \geq 5.63$,
      ii. a molecular weight distribution, $M_w/M_n$, as determined by gel permeation chromatography and defined by the equation: $(M_w/M_n) \leq (I_{10}/I_2) - 4.63$,
      iii. a gas extrusion rheology such that the critical shear rate at onset of surface melt fracture for the substantially linear ethylene polymer is at least 50 percent greater than the critical shear rate at the onset of surface melt fracture for a linear ethylene/α-olefin polymer, wherein the substantially linear ethylene polymer and the linear ethylene/α-olefin polymer comprise the same comonomer or comonomers, the linear ethylene/α-olefin polymer has an $I_2$, $M_w/M_n$ and density within ten percent of the substantially linear ethylene polymer and wherein the respective critical shear rates of the substantially linear ethylene polymer and the linear ethylene/α-olefin polymer are measured at 190° C. and nitrogen pressures between 250 to 5500 psig using a gas extrusion rheometer equipped with a 20:1 L/D die having a 0.0754 mm diameter and an 180° entrance angle,
      iv. a single differential scanning calorimetry, DSC, melting peak between −30 and 150° C.; and
      v. a short chain branching distribution index equal to or greater than about 50 percent; and
   (B) from 40 to 85 weight percent, based on the total weight of the mixture, of at least one second ethylene polymer which is a homogeneously branched ethylene/α-olefin polymer, heterogeneously branched linear ethylene/α-olefin polymer, or linear ethylene homopolymer having a density in the range of 0.930 to 0.965 g/cc; wherein the polymer mixture is characterized as having a density of from 0.890 to 0.930 g/cc, a differential between the densities of the first ethylene/α-olefin polymer and the second ethylene polymer of a least 0.015 g/cc, and an $I_2$ melt index greater than 10 grams/10 minutes wherein $I_2$ and $I_{10}$ are measured in accordance with ASTM D-1238, Condition 190° C./2.16 kilogram, and 190° C./10 kilogram, respectively.

2. A molded article comprising a polymer mixture, wherein the polymer mixture comprises
   (A) from 15 to 60 weight percent, based on the total weight of the mixture, of at least one first ethylene/α-olefin polymer which is a substantially linear ethylene polymer having a density in the range of 0.850 to 0.900 g/cc, wherein the substantially linear ethylene polymer is further characterized as having
      i. a melt flow ratio, $I_{10}/I_2 \geq 5.63$, ii. a molecular weight distribution, $M_w/M_n$, as defined by the equation: $(M_w/M_n) \leq (I_{10}/I_2) - 4.63$, iii. a gas extrusion rheology such that the critical shear rate at onset of surface melt fracture for the substantially linear ethylene polymer is at least 50 percent greater than the critical shear rate at the onset of surface melt fracture for a linear ethylene/α-olefin polymer, wherein the substantially linear ethylene polymer and the linear ethylene/α-olefin polymer comprise the same comonomer or comonomers, the linear/α-olefin ethylene polymer has an $I_2$, $M_w/M_n$ and density within ten percent of the substantially linear ethylene polymer and the respective critical shear rates of the substantially linear ethylene polymer and the linear ethylene/αolefin polymer are measured at 190° C. and nitrogen pressures between 250 to 5500 psig using a gas extrusion rheometer equipped with a 20:1 L/D die having a 0.0754 mm diameter and an 180° entrance angle, iv. a single differential scanning calorimetry, DSC, melting peak between −30° and 150° C.;

v. a n-hexane extractive level of substantially 100 weight percent based on the weight of the first ethylene/α-olefin polymer; and vi. a short chain branching distribution index equal to or greater than 50 percent; and (B) from 40 to 85 weight percent, based on the total weight of the mixture, of at least one second ethylene polymer which is a homogeneously branched ethylene/α-olefin polymer, heterogeneously branched linear ethylene/α-olefin polymer, or linear ethylene homopolymer having a density in the range of 0.930 to 0.965 g/cc;

wherein the polymer mixture is characterized as having a density of from 0.890 to 0.930 g/cc, a differential between the densities of the first ethylene ethylene/α-olefin polymer and the second ethylene polymer of at least 0.015 g/cc, and a compositional hexane extractive level of at least 30 percent lower than the expected extractive amount for the mixture based on the total weight of the mixture wherein $I_2$ and $I_{10}$ are measured in accordance with ASTM D-1238, Condition 190° C./2.16 kilogram, and Condition 190° C./10 kilogram, respectively, and wherein the hexane extractive is determined according to the Food and Drug Administration test method set forth under 21 37 C.F.R. § § 177.1520 (d)(3)(ii).

3. The molded article of claims 1 or 2, wherein the substantially linear ethylene polymer has 0.01 to 3 long chain branches/1000 carbons.

4. The molded article of claim 3, wherein the substantially linear ethylene polymer has at least 0.1 long chain branch/1000 carbons.

5. The molded article of claim 3, wherein the substantially linear ethylene polymer has at least 0.3 long chain branch/1000 carbons.

6. The molded article of claims 1 or 2, wherein the second ethylene polymer, Component (B), is a heterogeneously branched linear ethylene polymer or a substantially linear ethylene polymer.

7. The molded article of claims 1 or 2, wherein at least one of the first ethylene polymer, Component (A), or the second ethylene polymer, Component (B), is an interpolymer of ethylene and at least one alpha-olefin selected from the group consisting of 1-propylene, 1-butene, 1-isobutylene, 1-hexene, 4-methyl-1-pentene, 1-pentene, 1-heptene and 1-octene.

8. The molded article of claims 1 or 2, wherein at least one of the first ethylene polymer, Component (A), or the second ethylene polymer, Component (B), is a copolymer of ethylene and 1-octene.

9. The molded article of any of claims 1 or 2, wherein the mixture is prepared by mixing the first ethylene polymer and the second ethylene polymer together by at least one of the methods selected from the group consisting of melt mixing extrusion, dry blending, sequential operation of at least two polymerization reactors and parallel operation of at least two polymerization reactors.

10. The molded article of claims 1 or 2, wherein at least one of the first ethylene polymer of Component (A) and the second ethylene polymer of Component (B) is characterized by a melt index of 0.1 to 75 g/10 min.

11. The molded article of claim 2, wherein the compositional hexane extractive level is at least 40 percent lower than the expected extractive amount for the mixture.

12. The molded article of claim 2, wherein the compositional hexane extractive level is at least 50 percent lower than the expected extractive amount for the mixture.

13. The molded article of claims 1 or 2, wherein the mixture has a compositional hexane extractive level of less than 6 weight percent based on the total weight of the mixture.

14. The molded article of claims 1 or 2, wherein the molded article is in the form of a storage container.

15. The molded article of claim 1 or 2 wherein the molded article is in the form of a storage container lid.

16. The molded article of claim 14, wherein the molded article is fabricated by at least one of the techniques from the group consisting of injection molding, blow molding, compression molding, rotomolding and injection blow molding.

* * * * *